(12) United States Patent
Soffer et al.

(10) Patent No.: US 11,775,646 B2
(45) Date of Patent: Oct. 3, 2023

(54) ENHANCED SECURITY APPARATUS FOR MEDIATION BETWEEN CONSOLE PERIPHERAL DEVICES AND HOSTS

(71) Applicant: HIGH SEC LABS LTD., Caesarea (IL)

(72) Inventors: Aviv Soffer, Caesarea (IL); David Hirshberg, Haifa (IL)

(73) Assignee: HIGH SEC LABS LTD., Caesarea (IL)

( * ) Notice: Subject to any disclaimer, the term of this patent is extended or adjusted under 35 U.S.C. 154(b) by 139 days.

(21) Appl. No.: 17/499,921

(22) Filed: Oct. 13, 2021

(65) Prior Publication Data

US 2022/0215097 A1 Jul. 7, 2022
US 2023/0177159 A9 Jun. 8, 2023

(30) Foreign Application Priority Data

Jan. 7, 2021 (IL) .......................................... 280027

(51) Int. Cl.
*G06F 21/57* (2013.01)
*G06F 21/76* (2013.01)
(Continued)

(52) U.S. Cl.
CPC ............... *G06F 21/57* (2013.01); *G06F 3/14* (2013.01); *G06F 21/74* (2013.01); *G06F 21/76* (2013.01);
(Continued)

(58) Field of Classification Search
CPC ............. G06F 21/57; G06F 3/14; G06F 21/76
See application file for complete search history.

(56) References Cited

U.S. PATENT DOCUMENTS 7,725,558 B2 * 5/2010 Dickenson ............ H04L 63/105
  709/215
8,769,172 B2 7/2014 Soffer et al.
(Continued)

*Primary Examiner* — Viral S Lakhia
(74) *Attorney, Agent, or Firm* — ALPHAPATENT ASSOCIATES, LTD; Daniel J. Swirsky

(57) ABSTRACT

A secure mediator for coupling between one or more hosts and one or more consoles comprising one or more peripheral devices. the secure mediator comprises host side ports, each host side port is configured to be connected to a corresponding host, and console side ports, each console side port is configured to be connected to a corresponding peripheral device. The secure mediator comprises: a triggering circuitry; a timing/control circuitry; a setup circuitry; a switching circuitry; and the rest of the mediator circuitries, wherein the triggering circuitry, timing/control circuitry, setup circuitry, and switching circuitry are non-programable circuitries. The mediator has at least two stages: a security setup stage and a normal operation stage. The triggering circuitry is configured to monitor events and to signal these events to the timing/control circuitry in order to trigger a transfer between the security setup stage and the normal operation stage. The timing/control circuitry controls the execution of the security setup stage and transfers the mediator between the security setup stage and the normal operation stage. The setup circuitry performs one or more security functions in the security setup stage to enhance the cyber security of mediator. The switching circuitry, conditioned upon control from the timing/control circuitry, switches between the coupling of: (1) at least one of the host side ports with at least two of any one of (a) the setup circuitry; (b) the rest of the mediator circuitries; (c) one of the console side ports; (d) a null port, and (2) at least one of the console side ports with at least two of any one of (a) the setup circuitry; (b) the rest of the mediator circuitries; (c) one of the host side ports; (d) a null port.

21 Claims, 10 Drawing Sheets

(51) Int. Cl.
*G06F 21/85* (2013.01)
*G06F 21/74* (2013.01)
*G06F 3/14* (2006.01)

(52) U.S. Cl.
CPC ........ *G06F 21/85* (2013.01); *G06F 2221/034* (2013.01)

(56) References Cited

U.S. PATENT DOCUMENTS

| | | |
|---|---|---|
| 9,411,766 B2 | 8/2016 | Soffer |
| 9,501,157 B2 | 11/2016 | Soffer |
| 9,767,049 B2 | 9/2017 | Soffer et al. |
| 10,019,583 B2 * | 7/2018 | Swidowski ............. G06F 21/60 |
| 10,146,964 B1 * | 12/2018 | Shah ....................... G06F 21/76 |
| 10,417,157 B2 * | 9/2019 | Green ....................... G06F 3/14 |
| 10,467,169 B2 * | 11/2019 | Chang ................. G06F 13/4068 |
| 10,515,234 B2 | 12/2019 | Soffer |
| 10,699,668 B1 * | 6/2020 | Gupta ................... G06F 3/1423 |
| 10,855,470 B2 | 12/2020 | Soffer |
| 11,445,557 B2 * | 9/2022 | Pan ........................ H04W 76/00 |
| 11,574,048 B2 * | 2/2023 | Ho ........................ G06F 21/554 |
| 2008/0040796 A1 * | 2/2008 | Takasu ................ H04W 12/068 |
| | | 726/18 |
| 2010/0241836 A1 * | 9/2010 | Proudler ................. H04L 63/20 |
| | | 713/1 |
| 2014/0237609 A1 * | 8/2014 | Sharp ...................... G06F 21/10 |
| | | 726/26 |
| 2015/0365237 A1 * | 12/2015 | Soffer ................... G06F 13/105 |
| | | 726/20 |
| 2017/0039396 A1 * | 2/2017 | Sharp ........................ G06T 1/60 |
| 2017/0346851 A1 * | 11/2017 | Drake ................... H04L 9/0838 |
| 2020/0057508 A1 * | 2/2020 | Menachem ............ G06F 21/62 |
| 2022/0004635 A1 * | 1/2022 | Nemiroff ................ G06F 21/72 |
| 2022/0229940 A1 * | 7/2022 | Soffer ................... G06F 21/606 |

* cited by examiner

ENHANCED SECURITY APPARATUS FOR MEDIATION BETWEEN CONSOLE PERIPHERAL DEVICES AND HOSTS

FIELD AND BACKGROUND OF THE INVENTION

The present invention, in some embodiments thereof, relates to a mediator between host and peripheral devices and, more particularly, but not exclusively, to an enhanced security mediator between host and peripheral devices.

The mediator is a device that couples between a host and a console comprising one or more peripheral devices. The host may be a computer, a workstation, or any other computing device that is configured to be connected to one or more peripheral devices. Mediators are used for applications like communication standards conversion, aggregation of several communication protocols to a single one, extending the distance between the one or more hosts and the one or more consoles, switching between hosts and peripheral devices, etc. In some cases, the mediator comprises some security functions to protect the overall system from cyber threats. Such a mediator is referred as secure mediator. Examples of secure functions of mediators can be found in U.S. Pat. Nos. 8,769,172; 9,411,766; 9,767,049; 10,515,234; 9,501,157 and 10,855,470 titled "Secure KVM Device Ensuring Isolation of Host Computers", "Single Optical Fiber KVM Extender", "Isolated KVM Combiner for Multi-Network Computer System having a Video Processor", "Method and Apparatus for Securing KVM Matrix", "Secure KVM System having Multiple Emulated EDID Functions" and "USB Security Gateway", respectively. An objective of this invention is to provide secure mediators with enhanced security. Mediators with security functions according to the ones provided in the present invention referred herein as enhanced security mediators.

SUMMARY OF THE INVENTION

The present invention, in some embodiments thereof, relates to a mediator between host and peripheral devices and, more particularly, but not exclusively, to an enhanced security mediator between host and peripheral devices.

According to the present invention the mediator performs a security setup stage for securing the mediator operation against cyber threats. In some embodiments the security setup stage is performed with non-programable circuitries to protect against cyber threats that may abuse the security setup stage or the setup circuities.

According to an aspect of some embodiments there is provided a secure mediator for coupling between one or more hosts and one or more consoles comprising one or more peripheral devices, the mediator comprises:
one or more host side ports, each host side port is configured to be connected to a corresponding host by a peripheral devices communication protocol,
one or more console side ports, each console side port is configured to be connected to a corresponding one or more peripheral devices by a peripheral devices communication protocol,
a triggering circuitry;
a timing/control circuitry;
a setup circuitry;
a switching circuitry; and
the rest of the mediator circuitries,
wherein the triggering circuitry, timing/control circuitry, setup circuitry, and switching circuitry are non-programable circuitries, the mediator has at least two stages: security setup stage and normal operation stage, the triggering circuitry is configured to monitor events and to signal these events to the timing/control circuitry in order to trigger a transfer between the security setup stage and the normal operation stage, the timing/control circuitry controls the execution of the security setup stage and transfers the mediator between the security setup stage and the normal operation stage, the setup circuitry performs one or more security functions in the security setup stage to enhance the cyber security of mediator, and
the switching circuitry, conditioned upon control from the timing/control circuitry, switches between the coupling of: (1) at least one of the host side ports with at least two of any one of (a) the setup circuitry; (b) the rest of the mediator circuitries; (c) one of the console side ports; (d) a null port, and (2) at least one of the console side ports with at least two of any one of (a) the setup circuitry; (b) the rest of the mediator circuitries; (c) one of the host side ports; (d) a null port.

According to some embodiments of the invention, the secure mediator is configured to support at least one of or any combination of (1) keyboard; (2) mouse; (3) pointing device; (4) display; (5) card reader; (6) microphone; (7) speaker; and (8) camera.

According to some embodiments of the invention, the secure mediator is one of
(1) a KVM or a peripheral devices switch; (2) a KVM or a peripheral devices matrix;
(3) a peripheral devices distance extender; (4) a peripheral devices communication protocol aggregator; and (5) a peripheral devices communication protocol converter.

According to some embodiments of the invention, the security setup stage comprises copying a display EDID information to a non-volatile memory that reside in the secure mediator.

According to some embodiments of the invention, the security setup stage comprises qualifying one or more peripheral devices prior to coupling to the one or more hosts.

According to some embodiments of the invention, the security setup circuitry comprises USB enumerator.

According to some embodiments of the invention, the security setup stage comprises peripheral devices registration.

According to some embodiments of the invention, the triggering circuitry comprises a connection detector that detect a connection or a disconnection of peripheral device to the console side port.

According to some embodiments of the invention, the triggering circuitry comprises a connection detector that detect a connection or a disconnection of host to the host side port.

According to some embodiments of the invention, the triggering circuitry comprises auxiliary port for triggering security events to the security mediator.

According to some embodiments of the invention, the triggering circuitry comprises a user interface to enable user or administrator triggers security events to the security mediator.

According to some embodiments of the invention, the triggering circuitry comprises identification means to enable authorized triggers security events by administrators only.

According to some embodiments of the invention, the mediator stages further comprises neutralization stage, wherein in the neutralization stage coupling between at least one of the one or more hosts and at least one of the one or more peripheral devices is disabled.

According to some embodiments of the invention, in normal stage a direct coupling between at least one of the one or more host side ports and at least one of the one or more console side ports is provided.

According to some embodiments of the invention, in normal stage an indirect coupling between at least one of the one or more host side ports and at least one of the one or more console side ports is provided, wherein indirect coupling couples circuitries that providing security functions between the one or more host side ports and the one or more console side ports.

According to some embodiments of the invention, the security functions comprises at least one of or any combination of (1) host emulator; (2) device emulator; (3) unidirectional enforcing data flow element.

According to some embodiments of the invention, the secure mediator provides at least one of or any combination of (1) logging security events; (2) alerting security events; and (3) indicating security events.

According to some embodiments of the invention, the triggering circuitry; the timing/control circuitry, the setup circuitry; and the switching circuitry comprises at least one of or any combination of (1) timer; (2) state machine; (3) Flip-flops; (4) non programable IC; (4) PLD and (5) FPGA.

According to some embodiments of the invention, the one or more of peripheral devices share a single peripheral devices communication protocol.

According to some embodiments of the invention, the secure mediator is divided between two or more separated enclosures.

According to some embodiments of the invention, the secure mediator is a locking secure mediator comprising at least three stages:

(i) a security setup stage; (ii) a neutralization stage; and (iii) a normal operation stage, wherein in the security setup stage the mediator register the one or more peripheral devices, in the normal operation stage the mediator couple between the one or more hosts and the one or more peripheral devices conditioned upon that the one or more peripheral devices had been registered previously by the security setup stage, and in the neutralization stage the mediator disable coupling between the hosts and the peripheral devices condition upon at least one peripheral device that had not been registered in previously by the security setup stage is connected to the locking secure mediator.

According to an aspect of some embodiments there is provided a method for securing a mediator for coupling between one or more hosts and one or more consoles comprising one or more peripheral devices, the method is having at least three stages:

(i) a security setup stage; (ii) a neutralization stage; and (iii) a normal operation stage, wherein, in the normal operation stage, the mediator couples between at least one of the one or more peripheral devices and at least one of the one or more peripheral devices, in the neutralization stage the mediator disable coupling between at least one of the one or more peripheral devices and at least one of the one or more peripheral devices, the method starts the security setup stage after at least one of (a) a power-up; (b) a reset;

(c) a device connection; and (d) an unlock command, and upon entering the security setup stage the method performs the following steps:

(1) reading the device information of the one or more peripheral devices;

(2) if the mediator is in Unlock state, waiting for a locking command and upon locking command arrival, register the information of the one or more peripheral devices to non-volatile memory, and proceed to normal operation stage, (3) if the mediator is in Lock state, compare the registered information of the one or more peripheral devices with the information read in step (1), and upon a match proceed to normal operation stage and upon a miss-match proceed to neutralization stage, and wherein the method is configured to receive the lock and unlock commands from an authorized user or an administrator.

According to some embodiments of the invention, the method is implemented using non-programable circuitries.

According to some embodiments of the invention, the method is implemented using one or more programable controllers or processors.

According to some embodiments of the invention, the one or more peripheral devices are at least one of or any combination of (1) keyboard; (2) mouse; (3) pointing device;

(4) display; (5) card reader; (6) microphone; (7) speaker; and (8) camera.

According to some embodiments of the invention, the one or more peripheral devices are USB devices and reading the USB device information is performed by USB enumeration.

According to some embodiments of the invention, the method further comprises identification of the user or the administrator.

According to some embodiments of the invention, the method further comprises at least on of or any combination of logging, alerting, and indicating security events.

According to an aspect of some embodiments there is provided a method for securing a mediator for coupling between one or more hosts and one or more consoles comprising one or more peripheral devices, the method comprise at least three stages: (i) a security setup stage; (ii) a neutralization stage; and (iii) a normal operation stage, wherein in security setup stage the method register the one or more peripheral devices, in the normal operation stage the method couples between the one or more hosts and the one or more peripheral devices conditioned upon that the one or more peripheral devices had been registered previously by the security setup stage, and in the neutralization stage the method disables coupling between the hosts and the peripheral devices condition upon at least one peripheral device that had not been previously registered by the security setup stage is connected to the mediator.

According to some embodiments of the invention, the security setup stage starts after at least one of (a) a power-up; (b) a reset; (c) a connection of a peripheral device; and (d) an unlock command.

According to some embodiments of the invention, upon entering the security setup stage, the method performs the following steps:

(1) reading the information of the one or more peripheral devices;

(2) if the one or more peripheral devices are not yet registered, waiting for a locking command and upon locking command arrival register the information of the one or more peripheral devices to a non-volatile memory, and proceed to normal operation stage, (3) if the one or more peripheral devices are not yet registered, compare the registered information of the one or more peripheral devices with the information read in step (1), and upon a match proceed to normal operation stage, and upon a miss-match proceed to neutralization stage.

According to some embodiments of the invention, the method is implemented using non-programable circuitries.

According to some embodiments of the invention, the method is implemented using one or more programable controllers or processors.

According to some embodiments of the invention, the one or more peripheral devices are at least one of or any combination of (1) keyboard; (2) mouse; (3) pointing device; (4) display; (5) card reader; (6) microphone; (7) speaker; and (8) camera.

According to some embodiments of the invention, the one or more peripheral devices are USB devices and reading the USB device information is performed by USB enumeration.

According to some embodiments of the invention, the method further comprises identification of the user or the administrator.

According to some embodiments of the invention, the method further comprises at least on of or any combination of logging, alerting, and indicating security events.

According to an aspect of some embodiments there is provided a mediator for coupling between one or more hosts and one or more consoles comprising one or more peripheral devices, the mediator comprises:
one or more host side ports, each host side port is configured to be connected to a corresponding host by a peripheral devices communication protocol,
one or more console side ports, each console side port is configured to be connected to a corresponding one or more peripheral devices by a peripheral devices communication protocol,
a triggering circuitry;
a timing/control circuitry;
a setup circuitry;
a switching circuitry; and
the rest of the mediator circuitries,
wherein
the mediator has at least three stages: security setup stage; normal operation stage; and neutralization stage,
the triggering circuitry is configured to monitor events and to signal these events to the timing/control circuitry in order to transfer between said three stages,
the timing/control circuitry controls the execution and transfers the mediator between said three stages,
the setup circuitry reads, register and compare current to registered information of the one or more peripheral devices, and
the switching circuitry, conditioned upon control from the timing/control circuitry, switches between the coupling of: (1) at least one of the host side ports with at least two of any one of (a) the setup circuitry; (b) the rest of the mediator circuitries; (c) one of the console side ports; (d) a null port, and (2) at least one of the console side ports with at least two of any one of (a) the setup circuitry; (b) the rest of the mediator circuitries; (c) one of the host side ports; (d) a null port,
in the neutralization stage, the switching circuitry disables coupling between the hosts and the peripheral devices,
in the normal operation stage, the switching circuitry couples between the one or more hosts and the one or more peripheral devices, and
condition upon at least one peripheral device that had not been previously registered in the security setup stage by the setup circuitry the mediator enters neutralization stage.

According to some embodiments of the invention, the triggering circuitry, the timing/control circuitry, the setup circuitry; and the switching circuitry comprises only from non-programable circuitries.

According to some embodiments of the invention, at least one of or any combination of triggering circuitry, the timing/control circuitry, and the setup circuitry are implemented using one or more programable controllers or processors.

According to some embodiments of the invention, the mediator is configured to support at least one of or any combination of (1) keyboard; (2) mouse; (3) pointing device; (4) display; (5) card reader; (6) microphone; (7) speaker; and (8) camera.

According to some embodiments of the invention, the secure mediator is one of
(1) a KVM or a peripheral devices switch; (2) a KVM or a peripheral devices matrix;
(3) a peripheral devices distance extender; (4) a peripheral devices communication protocol aggregator; and (5) a peripheral devices communication protocol converter.

According to some embodiments of the invention, the mediator is configured to support USB devices.

According to some embodiments of the invention, the triggering circuitry comprises a connection detector that detect a connection or a disconnection of the one or more peripheral devices to/from the one or more console side ports.

According to some embodiments of the invention, the triggering circuitry comprises a connection detector that detect a connection or a disconnection of the one or more hosts to/from the one or more host side ports.

According to some embodiments of the invention, the triggering circuitry comprises a user interface to enable user or administrator triggers security events of locking commands and unlocking commands to the mediator.

According to some embodiments of the invention, the triggering circuitry comprises identification means to enable authorized triggers security events by administrators only.

According to some embodiments of the invention, the identification means is a card reader and the identification is made using a smart card inserted in to the card reader.

According to some embodiments of the invention, the mediator provides at least one of or any combination of (1) logging security events; (2) alerting security events; and (3) indicating security events.

According to some embodiments of the invention, the secure mediator is divided between two or more separated enclosures.

Unless otherwise defined, all technical and/or scientific terms used herein have the same meaning as commonly understood by one of ordinary skill in the art to which the invention pertains. In case of conflict, the patent specification, including definitions, will control. In addition, the materials, methods, and examples are illustrative only and are not intended to be necessarily limiting.

Implementation of the method and/or the mediator of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof.

For example, hardware for performing selected tasks according to embodiments of the invention could be implemented as a chip or a circuit. Selected tasks according to embodiments of the invention could be implemented as a plurality of software instructions being executed by a computer using any suitable operating system or by a hardware circuitry such as state machines. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

Figure 1:
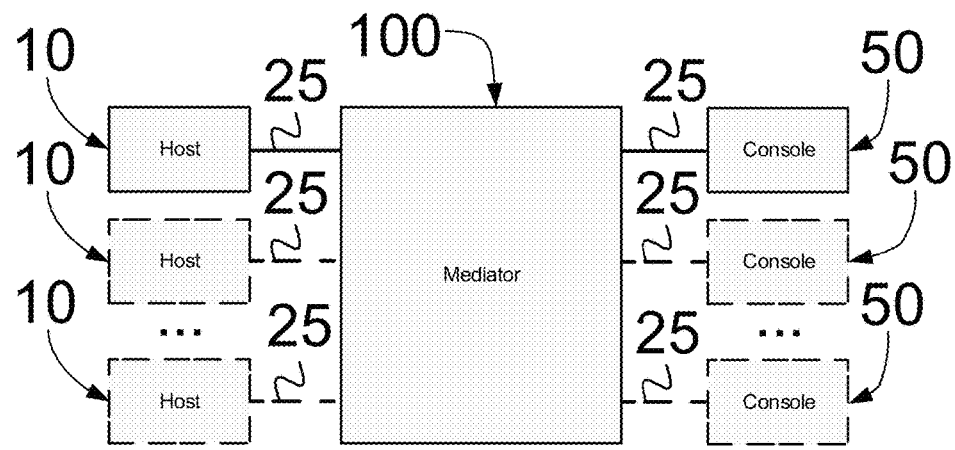
FIG. 1 is a schematic diagram of a mediator system that couple between one or more peripheral devices of one or more consoles and one or more hosts in accordance to the present invention.

It will be appreciated that for simplicity and clarity of illustration, where considered appropriate, reference numerals may be repeated among the figures to indicate corresponding or analogous elements.

DESCRIPTION OF SPECIFIC EMBODIMENTS OF THE INVENTION

The present invention, in some embodiments thereof, relates to a mediator between host and peripheral devices and, more particularly, but not exclusively, to an enhanced security mediator between host and peripheral devices.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Referring now to the drawings, FIG. 1 illustrates a high-level schematic diagram of a mediator system that couple between one or more peripheral devices of one or more consoles 50 and one or more hosts 10 in accordance with an embodiment of the present invention. As used herein, the term "host computer", or in short "host", means a computer, a workstation, or any computing device configured to be connected to one or more peripheral devices.

The data transfer between host 10 and console 50 is carried by one or more peripheral devices communication protocols 25. The types and number of peripheral devices communication protocols 25 is depended on the console's peripheral devices.

Mediator 100 comprises two types of ports that are configured to be connected to peripheral devices communication protocols 25: (1) host side ports, that are configured to be connected to host 10 via a peripheral devices communication protocol 25, and (2) console side ports, that are configured to be connected to peripheral devices 30 via a peripheral devices communication protocol 25.

Mediator 100 may be used between host 10 and console 50 for many reasons. For example, mediator 100 may be used to convert between peripheral devices communication protocols 25 or to extend the allowable distance between host 10 and console 50. Mediator 100 may be used to switch between a plurality of hosts 10 coupled to a single console, e.g., KVM switch, or simultaneously coupled between any one of the hosts 10 and any one of the consoles 50, e.g., KVM matrix. Additionally or Alternatively, mediator 100 may be used to provide security functions as will be discussed hereinafter.

Figure 2:
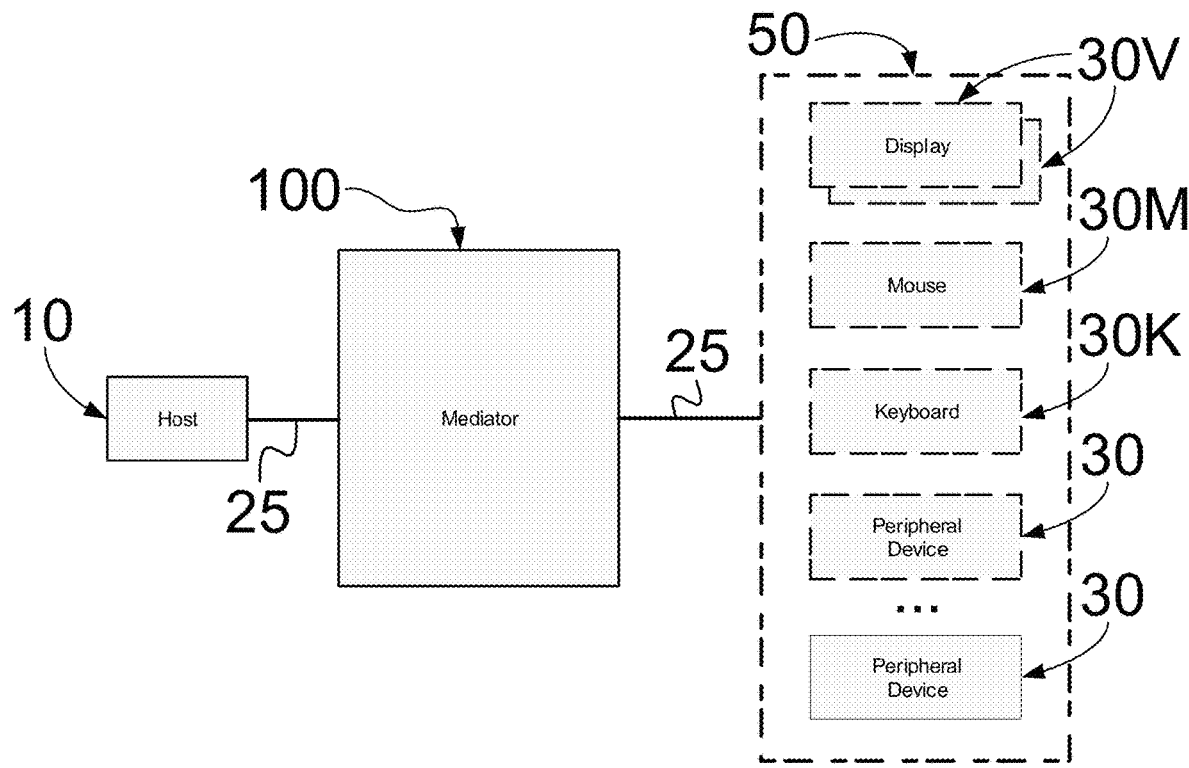
FIG. 2 is a schematic diagram of a mediator system that couple between one host and one console with supplementary details of types of peripheral devices within the console in accordance to the present invention.

Reference is now made to FIG. 2. FIG. 2 illustrates a schematic diagram of a mediator system that couple between one host 10 and one console 50 with supplementary details of types of peripheral devices within the console 50.

As used herein the term "console" means a collection (set) of peripheral devices 30, such as keyboard 30K, mouse 30M and one or more displays 30V. The peripheral devices are used by a user to interact with host 10. The peripheral devices 30, 30K, 30M, 30V of console 50 typically reside on the user's desktop or in a close proximity to the user, e.g., in a single room.

Peripheral devices 30 of console 50 may include printers, cameras, microphones, speakers, smart card readers, biometric identification devices, external mass storage devices, USB dongles, mobile terminals such as smartphones and the like.

Console 50 peripheral devices are coupled to host 10 using peripheral devices communication protocols 25. Peripheral devices communication protocols 25 may be a single communication protocol that aggregate all data transfers for the plurality of peripheral devices 30, 30K, 30M, 30V of console 50 or a plurality of peripheral devices communication protocols 25, each provide a data transfer between host and a single peripheral device or a subset of all peripheral devices in console 50.

Mediator 100 may convert and/or aggregate the peripheral devices communication protocols 25 between the host side and the console side. For example, keyboard 30K and mouse 30M may be connected to mediator 100 each by a single USB peripheral devices communication protocol 25 and mediator 100 may aggregate these two peripheral devices to one composite USB device, so that a single USB peripheral devices communication protocol 25 is used to connect mediator 100 to host 10.

Console 50 may include a display 30V, or a plurality of displays 30V. Display 30V may be connected to the host via one or more peripheral devices communication protocols 25 that are configured specific to transport video. The video specific peripheral devices communication protocols 25 may be VGA, DVI, HDMI, DisplayPort (DP) and the like. In some peripheral devices communication protocol 25, e.g., USB 3.0 or later, the keyboard, mouse, and display, i.e., the video stream and DDC channel, may be aggregated to a single peripheral devices communication protocol 25 between mediator 100 to host 10.

Peripheral devices communication protocols 25 may be parallel buses, serial buses, Universal Serial Bus (USB), and many other types of communication protocols, such as, SPI, I2C, CAN bus, SCSI, Fiber Channel (FC), IDE, ATA, PCI, PCI-x, IEEE 1394 (Firewire), Ethernet, Thunderbolt, Infini-Band and the like. In an exemplary embodiment of the invention, peripheral devices communication protocols 25 may be wireless protocols such as Wi-Fi, Bluetooth, Zigbee and the like.

As user herein, the term "peripheral devices communication protocol" means any communication media or communication protocol that are able to couple between a host and a peripheral device. The term may be used for a class of specific instances, as well as, the actual instances. The present invention is not limited to the types of peripheral devices communication protocols described herein above, and modifications and variations to support new versions, revisions, as well as other types, including new types, of peripheral devices communication protocols will be apparent to those skilled in the art.

In the embodiments illustrated in FIG. 1 and FIG. 2, mediator 100 has been implemented in a single enclosure. In an exemplary embodiment of the invention, mediator 100 may be implemented by a plurality of coupled components that are enclosed separately and may be in proximity to each other or far apart from each other.

Figure 3:
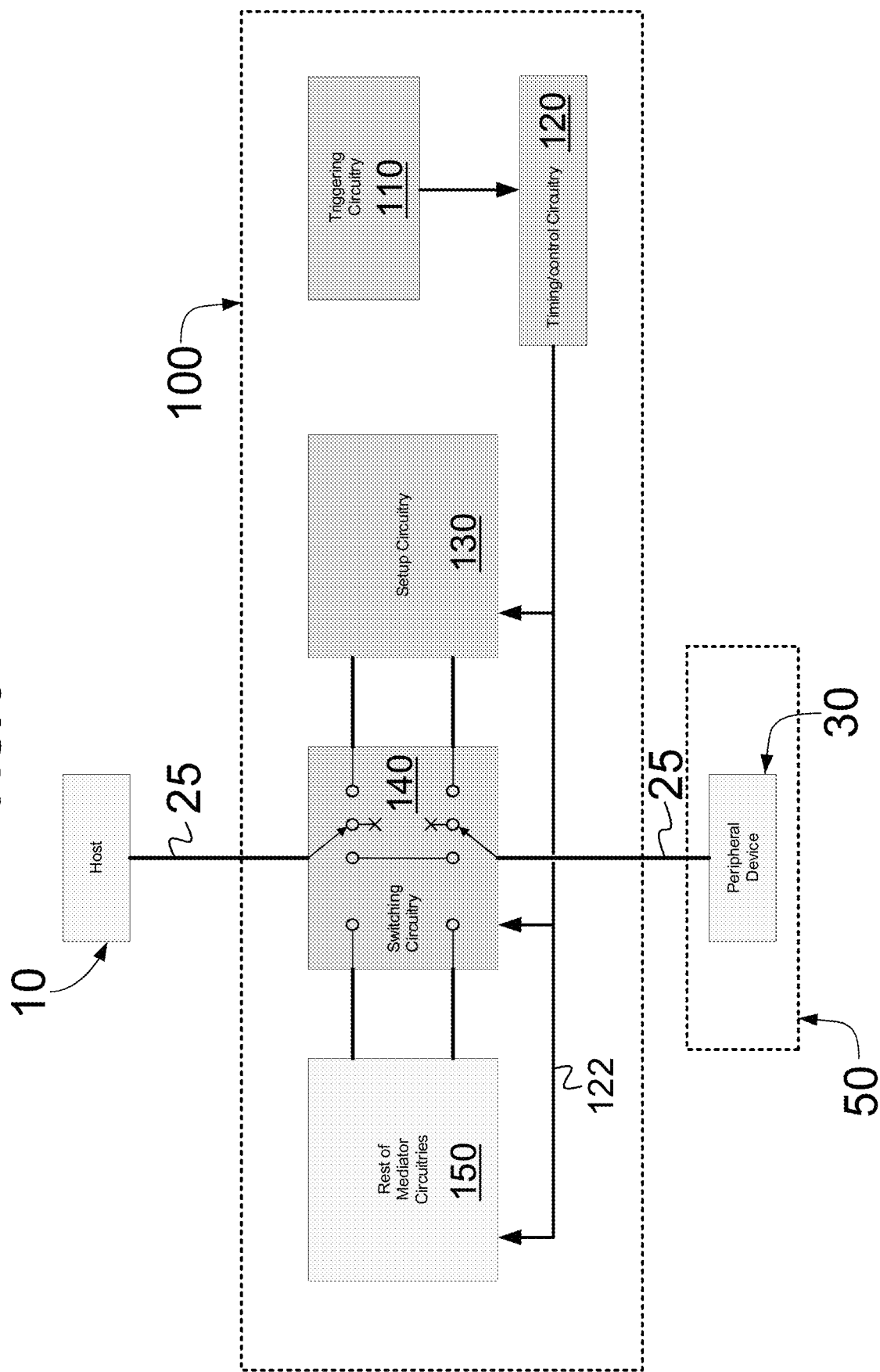
FIG. 3 is a simplified block diagram of a single channel of an enhanced security mediator coupling between a single host and a single peripheral device of a console in accordance to the present invention.

Reference is now made to FIG. 3. FIG. 3 illustrates a simplified block diagram of a single channel of an enhanced security mediator 100 coupling between a single host 10 and a single peripheral device 30 of a console 50. Mediator 100 comprises five circuitries: triggering circuitry 110, timing/control circuitry 120, setup circuitry 130, switching circuitry 140 and all the rest of mediator circuitries 150. Circuitries 110, 120, 130 and 140 are configured to enhance the security of mediator 100 by performing a security setup stage. The security setup stage performs a secure operation that proceed the normal operation stage that may be performed partially or completely by the rest of mediator circuitries 150. Optionally, all or almost all mediator functions are provided by circuitries 110, 120, 130 and 140 and the rest of mediator circuitries 150 are minimal or even do not exists. To enhance the security of mediator 100 and prevent all types of cyber threats including zero-day attacks, circuitries 110, 120, 130 and 140 are implemented using non-programable circuitries.

As used herein, the term "security setup stage" means a period in time where the mediator performs functions that effect or enhance the security of the mediator against threats such as cyber security attacks or the like.

As used herein, the term "normal operation stage" means a period in time where the mediator performs normal operation. Such normal operation is what the mediator is the operation the mediator is designed and intended to perform. The operation may comprise non secure related operation, such as, switching hosts, extending distance or converting protocols, and/or secure related operation, such as, isolating between hosts, enforcing unidirectional data transfer of communication protocol, and the like. Normal operation consists a coupling between one or more hosts and one or more peripheral devices.

As used herein, the term "non-programable circuitry" means any electric circuitry that does not include any processor or controller that is executing instructions, i.e., program, from any storage device, i.e., memory, including non-programable, program once, and read only memories.

The objective of triggering circuitry 110 is to initiate a security setup stage in mediator 100, i.e., to monitor events and to signal these events to the timing/control circuitry 120 in order to trigger a transfer to the security setup stage. The different types of triggering events will be discussed later on. For now, a simple trigger by a push button pressed by a user or authorized user, i.e., administrator, or a mediator power-up or reset events are examples for triggering events. The trigger is forward to a timing/control circuitry 120 that send timing and control signals 122 to at least one of circuitries 130, 140 and 150. Timing/control circuitry 120 controls the execution of the security setup stage and transfers the mediator between the security setup stage and the normal operation stage. Setup circuitry 130 comprises optional dedicated circuitry that is specific to the type of the peripheral device, the type of peripheral devices communication protocol 25, and the types of security measurements applied during security setup stage. Setup circuitry 130 performs one or more security functions in the security setup stage to enhance the cyber security of mediator. Exemplary specific circuitries for different embodiments are presented hereinafter. Switching circuitry 140 enable to couple the peripheral devices communication protocol 25 from both the host side (i.e., the host side port) and/or the peripheral side (i.e., the console side port) to either the setup circuitry 130, the rest of mediator circuitry 150 or directly to each other. Optionally, switching circuitry 140 may disconnect host side port and/or console side port. Disconnecting host side port and/or console side port may be implemented by connecting the host side port and/or console side port to a disconnected port, also refers hereinafter as a "null port".

In an exemplary embodiment of the invention, the peripheral devices communication protocol 25 is connected to setup circuitry 130 during security setup stage and to rest of mediator circuitry 150 during normal operation stage. Additionally or alternatively, switching circuitry 140 may couples host 10 and peripheral device 30 directly through the switching circuitry 140. It should be noted that the illustration of the switch in FIG. 3, illustrates a simple configuration and other configurations, including direct connection of peripheral devices communication protocol 25 from host side or peripheral device to either setup circuitry 130 or the rest of mediator circuitry 150, may be used in some of the embodiments. In some other configurations, such as a peripheral devices switch or a peripheral devices matrix type of mediator, the switching circuitry 140 may be used also to select between hosts or peripheral devices. The rest of mediator circuitry 150 performs all other functions of mediator 100. Functions may be protocol conversions, enforcing security policies such as enforcing unidirectional communication, performing device and/or host emulation, switching between hosts and the like.

In an exemplary embodiment of the invention, the mediator has at least two stages: security setup stage and normal operation stages. Optionally, the mediator has more stages, including but not limited to a plurality of security setup stage and a plurality of normal operation stages.

In the following paragraphs, examples of three types of enhanced security embodiments, in accordance with the present invention and the above scheme of FIG. 3, are presented. The first embodiment involves a display peripheral device with security setup stage of securing DDC channel and EDID data, the second embodiment involves a restriction of USB peripheral devices that are connected to the mediator, and the third embodiment involves locking or fixing the connection of peripheral devices to the mediator so that a user enforced to work with a specific set of peripheral devices in her console.

Figure 4:
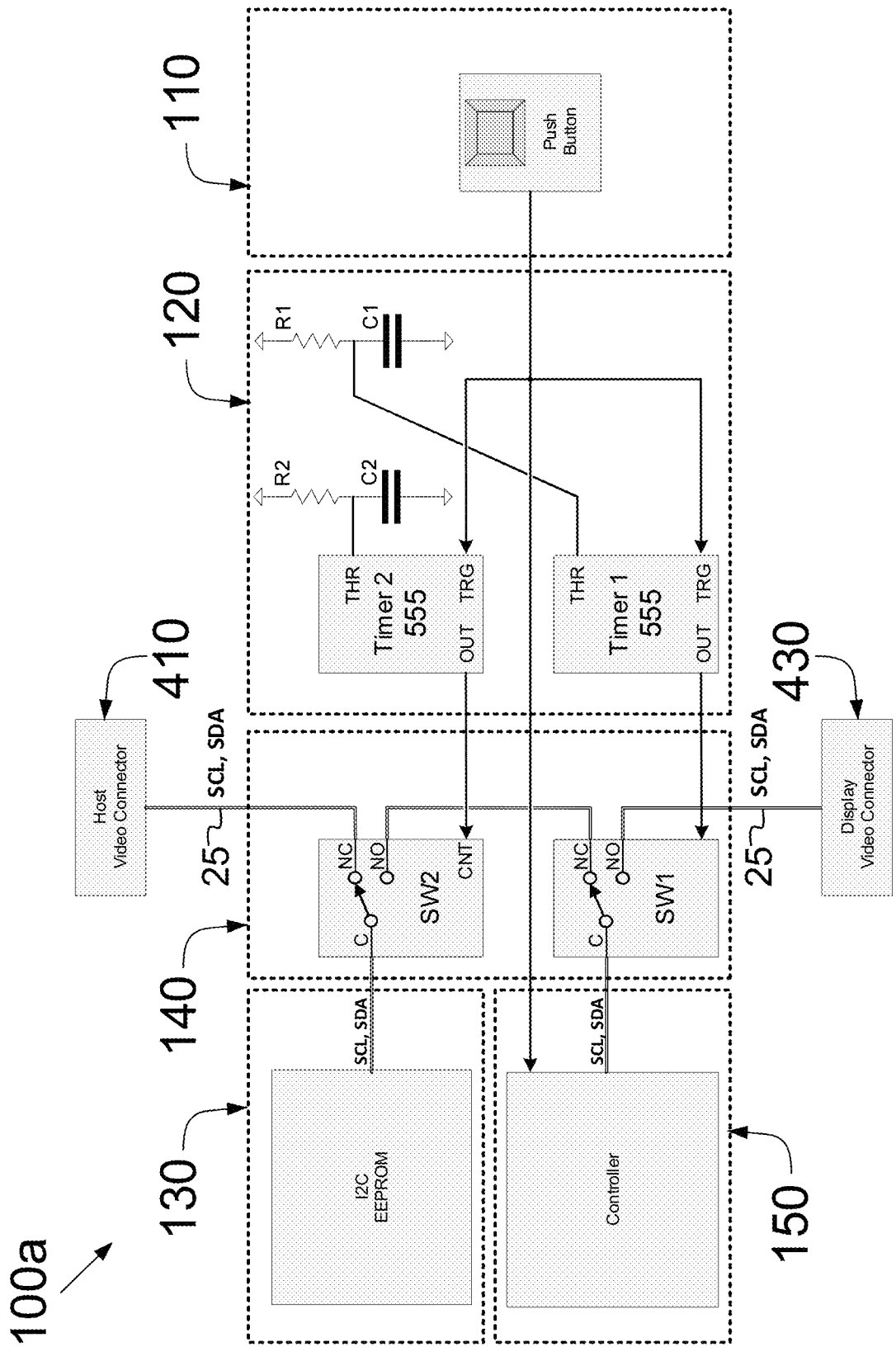
FIG. 4 is an illustration of a mediator comprising circuitries for securing a Display Data Channel (DDC) that is used to transfer EDID data of a display in accordance to exemplary embodiment of the present invention.

Reference is now made to FIG. 4. FIG. 4 illustrates a mediator 100a comprising circuitries for securing a specific type of peripheral devices communication protocol 25. The specific communication protocol is a protocol that is used to connect between a host and a display. This communication protocol is Extended Display Identification Data (EDID) that is transferred using Display Data Channel (DDC) with I2C protocol which is the most popular side channel protocol for plug and play operation between the host and the display over DVI, HDI or DisplayPort (DP) video transfer standards. This exemplary embodiment is an upgraded version that provides an enhanced security over previous secure functionality of EDID over DDC. The details of the non-enhanced version can be found in U.S. Pat. No. 9,501,157 titled "Secure KVM System having Multiple Emulated EDID Functions". Mediator 100a comprises two video connectors 410 and 430. Connector 410 is a host side port connected to host 10, and connector 430 is a console side port connected to display 430. Each connector carries peripheral devices communication protocol 25 that comprises, in this case, two I2C signals SCL (Clock) and SDA (Data). Through this I2C two-pin bus protocol the host can perform read/write operations from/to the display. To secure this channel, as described in U.S. Pat. No. 9,501,157 titled "Secure KVM System having Multiple Emulated EDID Functions", a local copy of the display's EDID memory is stored in mediator 100a. The host is limited to read only operation from this local copy. In the prior art case where the copy operation is performed by a programable controller, the controller may be hacked and may respond to a read or write operation at any time. The enhanced security mediator 100a, in this case, can initiate such a copy operation only when a trigger that is not related to the programable controller in any way, e.g., a press of the user on a push bottom, is occurred. In this exemplary simple case, the push button is the full triggering circuitry 110 disclosed in FIG. 3.

The timing/control circuitry 120 comprises two timers made of two ICs (the well-known 555 ICs). Each timer generates a one-shot signal with duration that is set by a pair of resistor and capacitor connected to the THR pin of the 555 IC. When the trigger is activated, i.e., the push button is pressed, timer 1 generates a signal with duration T1 (set by R1 & C1) and timer 2 generates a signal with duration T2 (set by R2 & C2).

The switching circuitry 140 comprises two switches: SW1 and SW2. Each switch can connect the two I2C signals from a common port (C) to one of two ports; Normally Open (NO) and Normally Closed (NC). In default state, the common port (C) is connected to the normally closed port (NC) and when the control pin (CNT) is active the common port (C) is connected to the normally open port (NO). The output of timer 1 controls SW1 and the output of timer 2 controls SW2. The setup circuitry 130 comprises an EEPROM, i.e., a non-volatile memory, that is configured to store the EDID data. The rest of mediator circuitry 150 comprises, among other circuitries a controller. In normal operation, SW2 connect the I2C EEPROM in circuitry 130 to host video connector 410 so that host 10 may read EDID data that is stored in the EEPROM. during normal operation stage, SW2 disconnect the controller in circuitries 150 from display video connector 410. In any time that the user decides to enable plug and play operation, i.e., to synchronize the EDID data in the display to the EEPROM in setup circuitry 130, i.e., to allow the host to learn the display in order to generate a correct display mode video signal, the user may press the push button in triggering circuitry 110. Pressing the push button generates two control signals to SW1 and SW2. The duration of T2 is longer than T1 enables the following operations to be performed. First, both SW1 and SW2 move to state NO disable the host from reading the EEPROM in setup circuitry 130, and enable the controller in the rest of mediator circuitry 150 to read the EDID data from display 30V. The time duration T1 is set to allow the controller to finish this task. Next SW move back to state NC and SW2 is still kept in NO to enable the controller to write, i.e., copy, the data that was read from the display to the EEPROM in setup circuitry 130. The duration T2-T1 is set to allow the controller to finish this task. When timer 2 output is deactivated (after T2), SW1 and SW2 are back to their normal state and host 10 can read now the new copy of the EDID data from EEPROM in circuitry 130. For the sake of figure clarity some details like full 555 IC pin connections, other video connectors pins, for example, Hot Plug Detect (HPC) as well as EEPROM pins, for example, Write Protect (WP) are not drawn. These supplementary details may be provided by any one of ordinary skill in the art.

It should be noted that this embodiment provides enhanced security over the embodiments in prior art (e.g., U.S. Pat. No. 9,501,157) since first, the control over the copy operation is triggered by the user and not the controller, and second, these circuitries 110, 120, 130 and 140 are non-programable so cannot be hacked by any software malicious cyber-attacks. In an exemplary embodiment of the invention, the controller is also replaced by a hard-wired logic circuitry, e.g., gates, FFs, PLAs, PLDs, FPGAs to perform operations of the read from the display and write to the EEPROM. In this case, this circuitry become part of setup circuitry 140 and is deducted from the rest of mediator circuitry 150.

This very simple circuitry demonstrates the invention main components. However, much more complex circuitries 110, 120, 130 and 140 to encompass other types of setup security functions may be used in alternative embodiments. For example, the triggering circuitry 110 may have additional triggering inputs and a plurality outputs, timing/control circuitry 120 may have more than two output signals and a plurality of triggering and control signals, setup circuitry 130 may comprises many components and a complex functionality, and switching circuitry 140 may have a plurality of host side ports and console side ports and a plurality of control signals. In some embodiments, circuitries 110, 120, 130 and 140 may be combined, for example, one may use TPL5010 IC to combine the triggering circuitry 110 based on power-up event with the timing/control circuitry 120 wherein the timing is based on setting the value of a single register.

Figure 5:
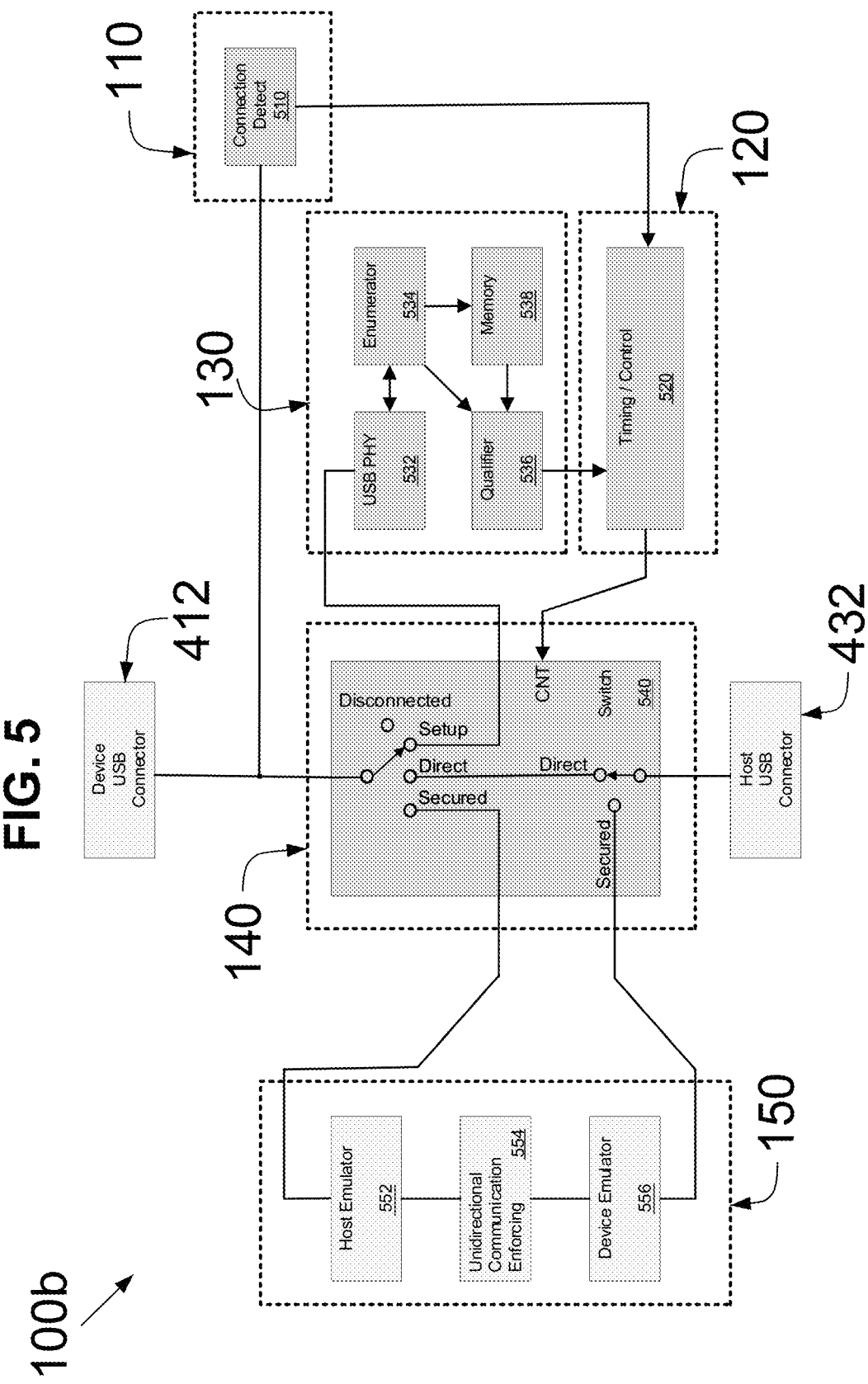
FIG. 5 is an illustration of circuitries of another enhanced security mediator that qualify USB peripheral device prior to coupling to a host in accordance to another embodiment of the present invention.

Reference is now made to FIG. 5. FIG. 5 illustrates additional circuitries of enhanced security functioning of a mediator 100b by qualifying USB peripheral device prior to coupling to hosts 10. This exemplary embodiment is an upgraded version that provides an enhanced security over similar secure functionality of qualifying USB peripheral devices. The details of the non-enhanced security version can be found in U.S. Pat. No. 10,855,470 titled "USB Security Gateway".

Mediator 100b comprises peripheral device USB connector 412 (a console side port), and host USB connector 432 (a host side port). In normal operation stage, the host 10 is coupled to peripheral device through the USB bus. The non-programable circuitries 110, 120, 130 and 140 comprises triggering circuitry 110 comprises connection detect circuitry 510. Connection detect circuitry 510 is connected to the device USB connector and may trigger an event whenever a USB plug is connected or disconnected from the matching receptacle connector 412 (i.e., the USB socket connector). Upon new connection, the timing/control circuitry 520 in timing/control circuitry 120 instructs the switching circuitry 140 comprises switch 540 to switch to setup state wherein the USB signals from peripheral device USB connector 412 are directed to the setup circuitry 130. The setup circuitry 130 comprises USB PHY 532 to perform the PHY level handshake with the peripheral device over the USB. Via the USB PHY 532, an enumerator 534 performs enumeration transactions on the USB bus to get the information of the peripheral device 30. The device information may include device class, device model, device vendor ID, device unique ID and the like.

The peripheral device information is stored in a memory 538. Upon completion of the enumeration, a qualifier 536 check the information and decide if the peripheral device may be connected directly to host 10, connected through the rest of mediator circuitry 150, or prohibited, i.e., banned, from connection with host 10. Upon this decision, timing/control circuitry 520 in timing/control circuitry 120 instruct switch to states direct, secured or disconnected respectively. Optionality, timing/control circuitry 520 may disconnect the peripheral device after a connection time is expired. If the peripheral device is connected to the host via the secured state, the coupling between the host and the peripheral device is going through additional processing in the rest of mediator circuitries 150. For example, if the USB device is a keyboard or mouse, such additional circuitry may be the following security circuits. The keyboard or the mouse may be connected to host emulator 552 that transfer only data from the keyboard or the mouse to a unidirectional communication enforcing device 554 that ensure that no data can be sent to the KB or the mouse. The data is sent to a device emulator that send it to the host through switch 540 and host USB connector 432. In case the USB peripheral device is a digital speaker, a unidirectional communication enforcing device 554 that allow only data from the host to the peripheral device may be used. Additionally, or alternatively, other type of processing between peripheral device and host, for security reasons or non-security functions, may be performed.

In an exemplary embodiment of the invention, enumerator 534 and qualifier 536 may be implemented in FPGA. Additionally, memory 538 and timing/control 520 may be implemented in the same FPGA. Alternatively, all non-programable circuitries 110, 120, 130 and 140 may be implemented in one or more FPGAs.

Figure 6:
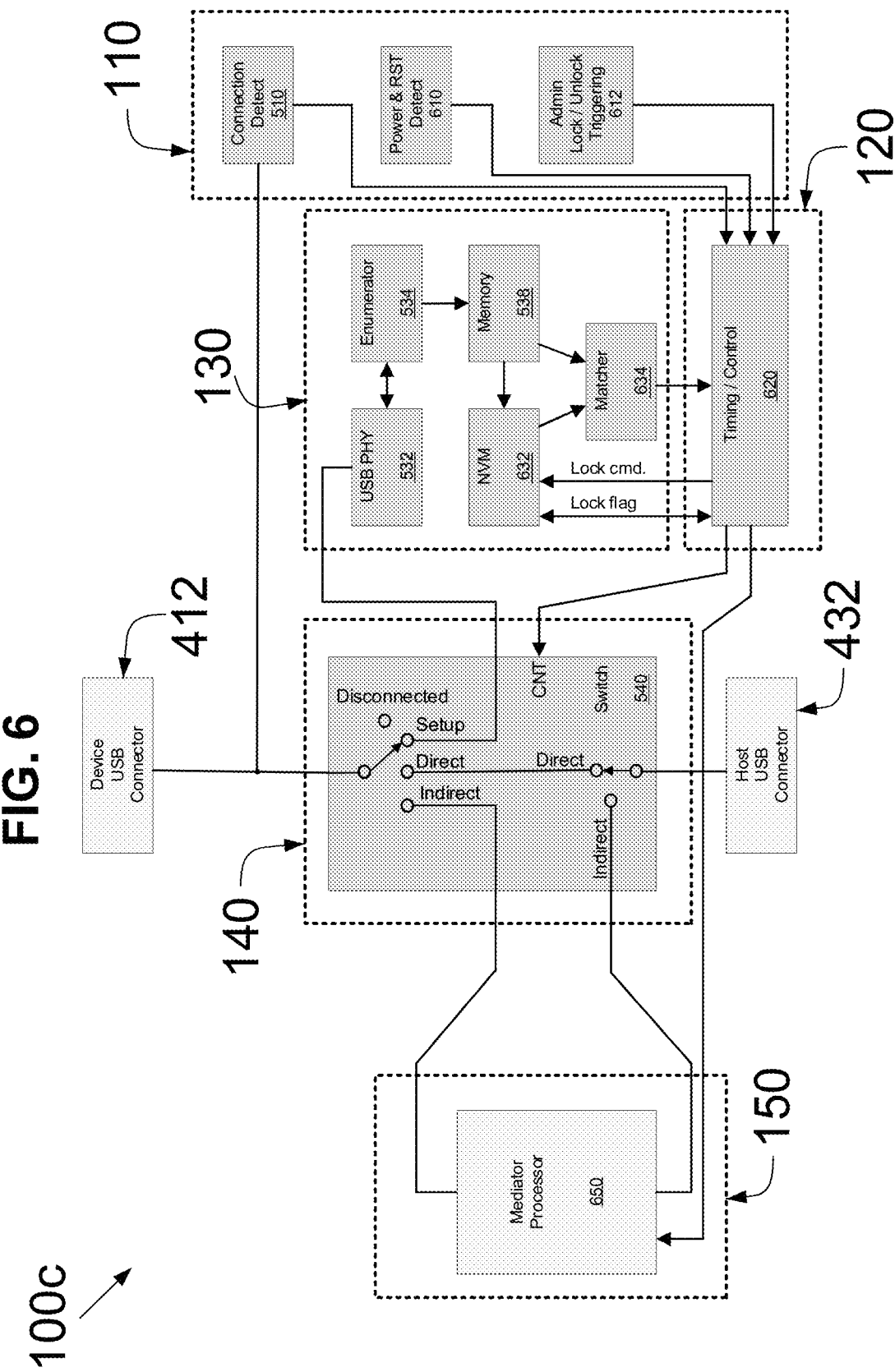
FIG. 6 is a schematic illustration of circuitries of yet another embodiment of enhanced security mediator that enforces locking of peripheral devices in accordance to yet another embodiment of the present invention.

Reference is now made to FIG. 6. FIG. 6 is a schematic diagram of another embodiment of the invention. In this embodiment the security setup stage enforces locking, i.e., freeze no change, of the peripheral devices that are connected to a mediator 100c. The schematic is for a single USB device, but it can simply be extended, with the proper modification, to support any type of peripheral device as well as to support a plurality of peripheral devices.

As used herein, the term "locking mediator" means a mediator that locks a set of peripheral devices connected to the locking mediator and do not allow, neutralized or disable the mediation normal operation whenever any of the peripheral devices are changed or replaced unless new authorized locking operation, i.e., registration, is performed, optionally by authorized person such as an administrator. Registration means reading and storing for future checking the peripheral device information during security setup stage when the device is authorized to "learn" the connected peripheral devices.

As in FIGS. 3-5, circuitries 110, 120, 130 and 140 are non-programable so cannot be hacked by any software driven malicious cyber-attacks. The goal of the security setup stage is to first determined the connected peripheral device (or the set of peripheral devices) and then lock the connected peripheral device so it cannot be replaced without administrator permission or by a trusted user. The USB peripheral device may be connected to mediator 100b through peripheral device USB connector 412, i.e., the console side port. In the case of USB peripheral device, upon power-up or reset, the setup circuitry 130 performs the enumeration as in the embodiment of FIG. 5. The enumeration data is stored in memory 538. If this is the first use of mediator 100c, a lock flag, stored in the non-volatile memory 632, is in state Unlock (e.g., zero) and timing/control circuitry 620 will wait for a lock trigger command from administrator, or the like, from admin Lock/Unlock triggering circuitry 612 in triggering circuitry 110. Lock trigger may come from special code sequence (e.g., a password) pressed by the administrator on the keyboard connected to mediator 100c or by other means as discussed later on. After locking trigger is received, timing/control circuitry 620 instruct to store the peripheral device information in the non-volatile memory 632, i.e., register the device, and set the lock flag to Lock state. Then timing/control circuitry 620 instructs the switch 540 to couple the peripheral device to the host. As before, the coupling can be direct or indirect through the rest of mediator circuitry 150 that may include some processing performed by a programable processor. From switch 540 in switching circuitry 140, the USB bus is connected to host side connector 432, i.e., the host side port. To indicate that the mediator is operating in normal operation stage, timing/control circuitry 620 reports a proper status to mediator processor 650 in the rest of mediator circuitry 150. Mediator processor 650 may indicate this status to the user via indicator such as LED that illuminate with green color. After a sequence of power-down and power-up events, the non-volatile memory 632 keep the lock flag and the registered device information and upon power-up, setup circuitry 130 will perform new enumeration cycle and matcher 634 will check that the same peripheral device is connected to mediator 100c. In case that a new device was plugged to mediator 100c, the match will fail and timing/control circuitry 620 will instruct switch 540 to disconnect the peripheral device (i.e., enter neutralization stage) as well as to report the event to the mediator processor 650 which may indicate the user as well as send alert to the administrator. Alternatively, indication to the user and/or sending alert to the administrator is performed by timing/control circuitry 620. In addition, in any power-up or reset events the administrator has a period of time, for example, 20 second or 60 second, to unlock mediator 100c. If mediator 100c is unlocked, a new peripheral device may be qualified by mediator 100c. In the case of having a plurality of peripheral devices in the same console, each device may be enumerated and learned independently, however, the lock flag and locking/unlocking mechanism may be shared among all peripheral devices.

Figure 7:
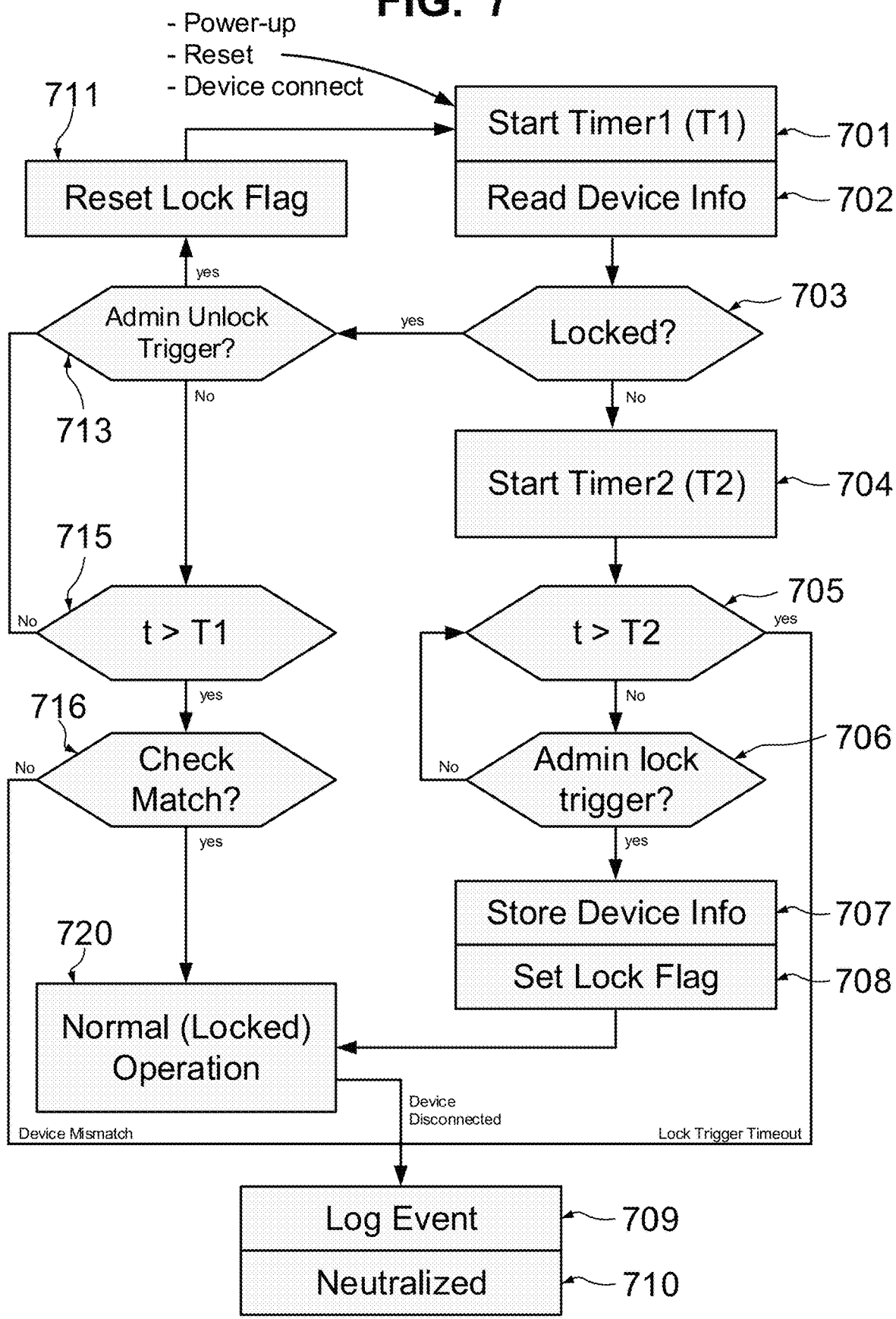
FIG. 7 is a flow chart of the method to perform the lock operation of the mediator of FIG. 6 in accordance to the present invention.

Reference is now made to FIG. 7. FIG. 7 is a flow chart of the method to perform the locking operation of the mediator. In an exemplary embodiment of the invention, the illustrated flowchart is carried out by the elements 110, 120, 130 and 140 presented in FIG. 6. After power-up or reset, in step 701, Timer 1, implemented in timing/control circuitry 620, is triggered. Timer 1 counts the time for the administrator to unlock the mediator and allow new peripheral devices to be registered as the peripheral devices connected to the mediator. At the same time or immediately after, in step 702, setup circuitry 130 read the peripheral device info. If the peripheral device is USB device, reading the device information may be done using USB PHY 532 and enumerator 534. If the peripheral device is a display or similar video sink device, reading the device information may be done by reading the EDID data as illustrated in FIG. 4. In general, for each type of peripheral device interface, a specific tailored circuitry is used to read the device information. The device information is stored in memory 538. In step 703, the status of the lock flag that is stored in NVM 632 is checked. During the first operation of the mediator, this flag is set to zero, i.e., the mediator is unlocked and the mediator state is Unlock. In Unlock state a peripheral device (or plurality of peripheral devices in mediator that support more than one peripheral device) need to be registered and locked by administrator to be the only allowed peripheral device to be used by the mediator. If in step 703, the lock flag is not set, in step 704, a second timer, Timer 2, is started to offer an administrator a time to lock the mediator. Duration T2 may be enough time for the administrator to perform the needed operations to trigger the lock operation using admin lock/unlock triggering circuitry 612. For example, duration T2 may be 2 minutes. Duration T2 may be shorter or longer, depends on the triggering scheme. In an exemplary embodiment of the invention, Timer 2 is not used and the mediator will wait (in step 706) until admin trigger will arrive. If locking time duration, T2, has passed (i.e., lock trigger timeout occurred) without locking, the mediator (i.e., the timing/control circuitry 620), by performing the 'yes' branch in step 705, may go to step 709 and, optionally, log this event, indicate the user and/or send an alert. At the same time, or immediately after, in step 710, the mediator will be neutralized, i.e., the mediator will stay in neutralization stage. The meaning of neutralized is that the peripheral device will not be able to be coupled to the host. The neutralization is performed by controlling switch 540 to disconnected state. If in step 705 the 'no' branch is taken, in step 706 a check for the arrival of lock trigger (i.e., lock command) from the administrator is performed. If such command arrived (the 'yes' branch), in step 707 a copy of the peripheral device information from memory 538 to NVM 632 is performed. The device information stored in NVM 632 will not be lost when the mediator is powered off and will be checked against the present connected peripheral device as long as the mediator is locked, i.e., in Lock state. At the same time or immediately after, in step 708, the lock flag, which is also reside in NVM 632, is set to Lock state. Next, the mediator, i.e., the timing/control circuitry 620 moves to step 720. In step 720, the mediator is in normal operation stage (i.e., locked operation). In the normal operation stage, the one or more registered, allowed to be used, peripheral devices are coupled to the one or more hosts. The coupling may be direct through switch 540 or indirect through switch 540 and the rest of mediator circuitries 150. In an exemplary embodiment of the invention, the coupling may be through mediator processor 650 or other programable processors or controllers in mediator 100 or 100c. Timing/control circuitry 620 control switch 540 according to the type of the peripheral device. In an exemplary embodiment of the invention, only direct coupling is available in the mediator. Alternatively, only indirect coupling is available in the mediator. For example, keyboard and mouse may be connected using indirect coupling while other devices may be connected using direct coupling.

During normal operation (step 720), if the peripheral device is disconnected from the mediator (e.g., detected by connection detect circuitry 510) timing/control circuitry 620 gets a trigger event from connection detect circuitry 510 and jump to step 709 and 710 as well. Logging and alerting of such event as well as indication to the user may be performed and the peripheral device will be neutralized. If the device is reconnected the mediator is forced to go back to step 701 where the device information will be read again. Only if the same device was reconnected, the coupling between the device and the host will be reestablished. In this re-connect event, as well as any reset or power-up events, if in step 703, the device is already in Lock state, the flow goes to step 713. Steps 713 and 715 give the administrator a time window to unlock a locked mediator. The purpose of this locking security scheme is to prevent from the user the ability to change his console configuration and to prevent unintentional or malicious user operations that will breach cyber security policy. However, the administrator, from time to time, may want to replace the peripheral device in order, for example, to replace a faulty peripheral device or to upgrade the peripheral device. To allow the administrator to make such replacements, a time duration of T1 is provided to unlock the mediator after power-up. Duration T1 may be, for example, 20 seconds, shorter or longer depend on the triggering scheme. If administrator unlock command is provided to the admin lock/unlock triggering circuitry 612 before Timer 1 timeout occurs, in step 713, timing/control circuitry 620 moves to step 711 that reset the lock flag to Unlock state. After resetting the lock flag, the mediator goes back to starting step 701. If timer 1 timeout occurred, in step 715, then in step 516 the mediator check for a match between the stored device info in the NVM 632 and the last read device info in memory 538. If there is a match, the mediator moves to step 720 where normal (lock) operation is performed as describe hereinabove. If in step 716, there is no match, i.e., peripheral device had been changed, the mediator moves to step 709 and neutralized peripheral device operation as describe hereinabove.

For a device with a serial number data in the device information, a match will be with same type of the device, the model type, the manufacturer name and with the same serial number. Otherwise, a match will be based on parameters such as the type of the device, model type, manufacturer name without checking the serial number data field.

While the above embodiment of the invention given a detailed specific implementation of a locking mediator that locks the peripheral devices, other implementations with similar behavior are also intended to be part of this invention. For example, while the above embodiment forces the administrator to lock and unlock the mediator in specific time frames (which make the mediator more secure), in the following embodiment, the administrator can provide the lock and unlock commands at any time. Such scheme may be more suitable for lock and unlock commands operation performed remotely, a feature that is discussed later on.

Figure 8:
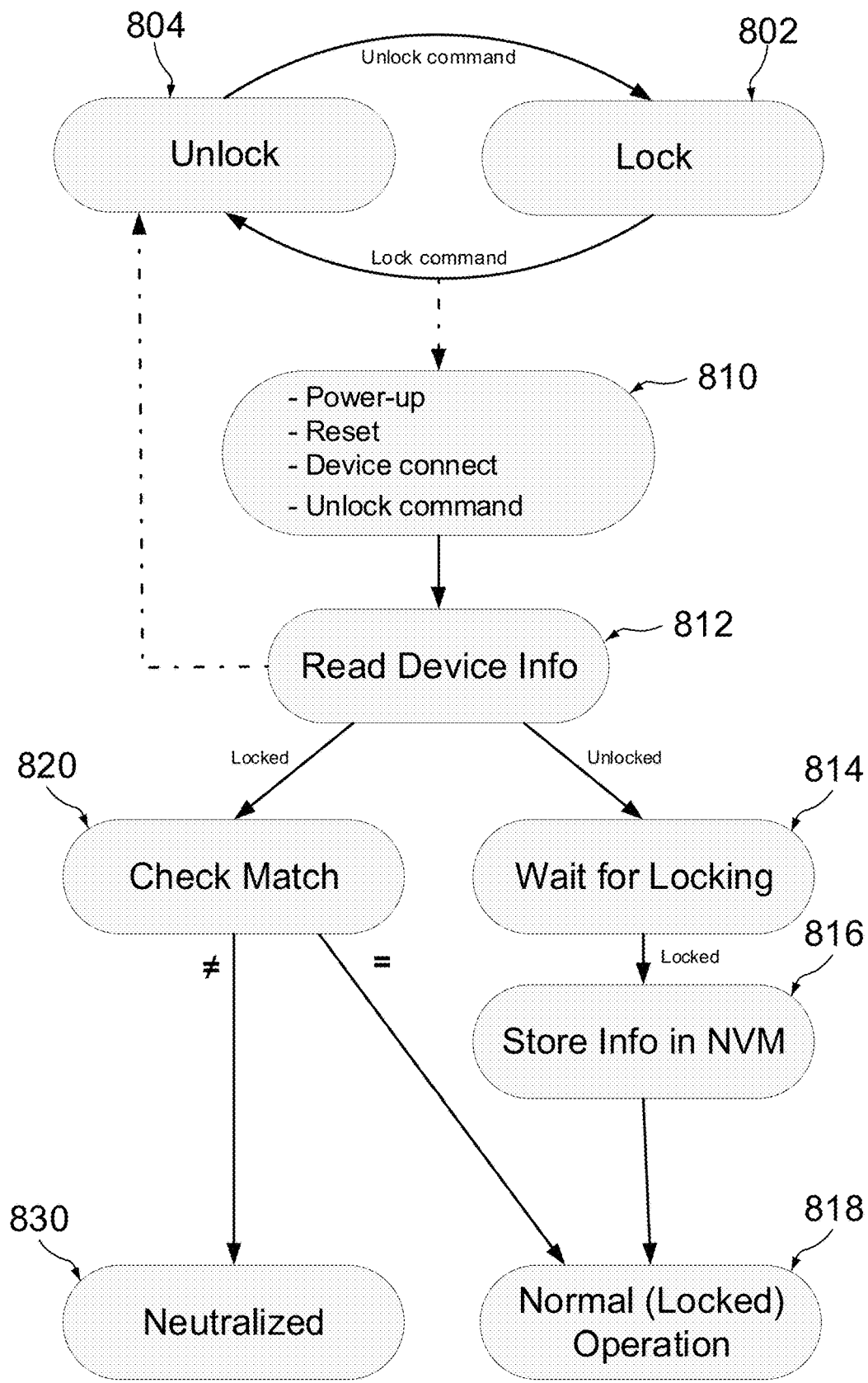
FIG. 8 is a flow chart of alternative method to control the lock operation of the mediator in accordance to another embodiment of the present invention.

Reference is now made to FIG. 8. FIG. 8 is a flow chart of alternative method to control the lock operation of the mediator. In this embodiment, the lock and unlock commands can arrive and handled at any time. An auxiliary state machine, with two state: Lock 802 and Unlock 804, is provided. The auxiliary state machine receives from the user/administrator two types of commands: lock command and unlock command. The commands are received and interpreted by admin lock/unlock triggering circuitry 612 in triggering circuitry 110. The corresponding triggers are sent to timing/control circuitry 620. The auxiliary state machine is storing its state in a non-volatile memory, e.g., NVM 634. The transfer from Lock state to Unlock state force a reset, i.e., moving to step 810 in the main state machine. The transfer from Unlock state back to Lock state may be allowed only after the main state machine is checking the lock flag, i.e., the Lock/Unlock state, by step 812 of the main state machine.

The main state machine starts execution is step 810 after the at least one of the following events: (1) power-up, (2) reset, (3) a device is connected to the mediator peripheral device connector, and (4) the mediator state altered from Lock to Unlock. Following step 810, in step 812, the mediator reads the device information. At this point of time the locking mediator checks its Lock/Unlock state. If the locking mediator state is Unlock, the mediator waits (in step 814) for a change in auxiliary state machine from Unlock to Lock. When the state of the locking mediator altered to Lock state, the execution moves to step 816. In step 816 the device information is stored in a non-volatile memory, e.g., NVM 634. Storing the device information in the non-volatile memory at this time is interrupted as registration of the device to be used in normal operation stage. Following step 816, execution moves to step 818. In step 818 the mediator is in normal operation and the device is coupled to the host as described hereinabove.

If at the end of step 812 the mediator state is Lock, the main state machine of the locking mediator is transferred to step 820. In step 820, a check if there is a match between the registered device information in non-volatile memory 634 and the present read device information is performed. If there is a match, the locking mediator 100c moves to step 818 and enter normal operation stage (i.e., the devices are registered and locked). If there isn't a match, the mediator moves to step 830. In step 830 the peripheral device is neutralized as explained hereinabove and the locking mediator is in neutralization stage. When the device is in neutralization state it will keep in this stage until occurred one of the events that bring the main state machine back to step 810. In an exemplary embodiment of the invention, entering step 820 (i.e., neutralization stage) will activate at least one of logging this event, indicating neutralization stage to the user, and sending an alert (similar to step 709 described hereinabove). If after reset, the device is matched again (for example in the case where the user tries to connect other device, then reconnect back the registered device) the mediator will return to normal operation stage. Alternatively, the mediator stays inoperable until administrator intervention.

In an exemplary embodiment of the invention, the mediator for coupling between one or more hosts and one or more consoles comprising one or more peripheral devices is performing at least three stages: (i) a security setup stage; (ii) a neutralization stage; and (iii) a normal operation stage. in the normal operation stage, the mediator couples between at least one of the one or more peripheral devices and at least one of the one or more peripheral devices. in the neutralization stage the mediator disable coupling between at least one of the one or more peripheral devices and at least one of the one or more peripheral devices. The security setup stage starts after a power-up, a reset, a connection a device, or an unlock command. Upon entering the security setup stage the method performs the following steps:

(1) reading the device information of the one or more peripheral devices;

(2) if the mediator is in Unlock state, waiting for a locking command and upon locking command arrival, register the information of the one or more peripheral devices to non-volatile memory, and proceed to normal operation stage;

(3) if the mediator is in Lock state, compare the registered information of the one or more peripheral devices with the information read in step (1), and upon a match proceed to normal operation stage and upon a miss-match proceed to neutralization stage, and wherein the method is configured to receive the lock and unlock commands from an authorized user or an administrator.

FIGS. 3-6 and the accompanied description hereinabove focus on describing a mediator coupling between a single host and a single peripheral device. In general, the mediator may couple between multiple hosts and multiple peripheral devices, and optionally the peripheral devices are located within multiple consoles. For example, the mediator may be a KVM switch with a single console comprising a keyboard, a mouse and a display, and four hosts that can be switched so that a single user can control each one of the four hosts by selecting the active host. In another example, the mediator may be a peripheral matrix with 16 hosts connected to the matrix and 8 consoles for 8 users, wherein each console can support a keyboard, a pointing device, two displays, a smart card reader, a microphone, a video camera, a speaker and several additional USB ports for other peripheral devices, such as, printer, mass storage device and the like.

Figure 9:
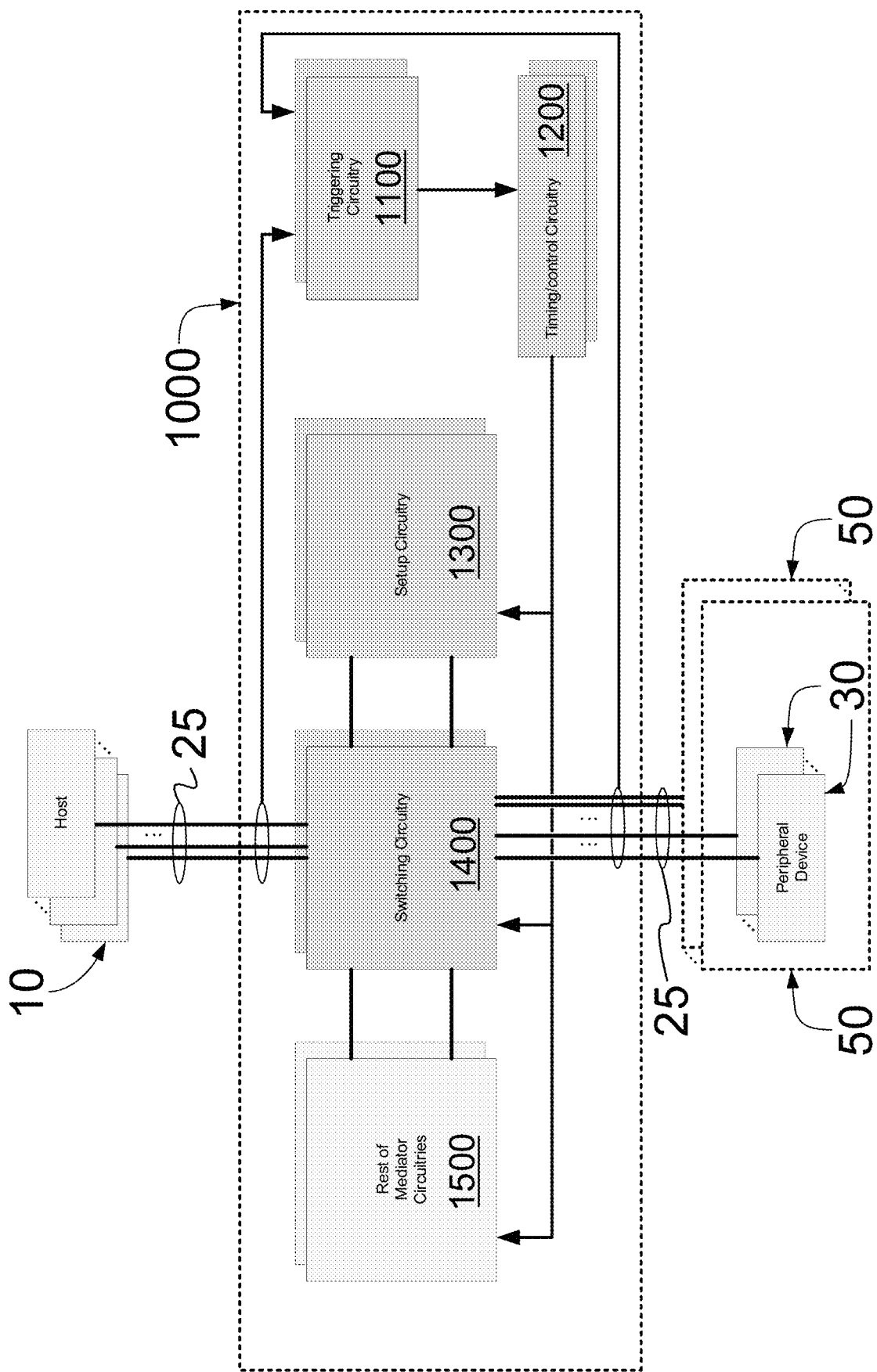
FIG. 9 is a block diagram of enhanced security mediator supporting multiple coupling channels for coupling between a plurality of hosts and a plurality of peripheral devices.

Reference is now made to FIG. 9. FIG. 9 illustrates a simplified block diagram of enhanced security mediator 1000 supporting multiple coupling channels for coupling between a plurality of hosts 10 and a plurality of peripheral devices 30, optionally located in a plurality of consoles 50.

Each host 10 is connected, through the hosts side ports, to mediator 1000 by one or more peripheral devices communication protocols 25 and overall mediator 1000 is configured to be connected to a plurality of peripheral devices communication protocols 25 from all the hosts 10 that are supported by mediator 1000. Similarly, each peripheral device 30 is connected through the console side ports, to mediator 1000, by one or more peripheral devices communication protocols 25 and overall mediator 1000 is configured to be connected to a plurality of peripheral devices communication protocols 25 from all the peripheral devices 30 that are supported by mediator 1000. The peripheral devices 30 may be located in plurality of consoles 50.

In an exemplary embodiment of the invention, a plurality of peripheral devices 30 may share a single peripheral devices communication protocol 25. For example, USB keyboard and mouse may share a single USB connectors and cables by using a composite USB device protocol. In a similar manner, a keyboard, a mouse and a display may be shared by a single USB 3.0 or later peripheral devices communication protocol.

Similar to mediator 100 in FIG. 3, mediator 1000 comprises five circuitries: triggering circuitry 1100, timing/control circuitry 1200, setup circuitry 1300, switching circuitry 1400 and all rest of mediator circuitries 1500. Similarly, to the description above, circuitries 1100, 1200, 1300, and 1400 are used to enhance the security of mediator 1000 by performing a security setup stage. For enhancing the security against all types of cyber threats these circuitries (1100, 1200, 1300, and 1400) are implemented using non-programable circuitries.

Triggering circuitry 1100 are used to perform the security setup stage in mediator 1000 as well as to monitor events that related to securing the mediator. Triggering circuitries may be duplicated for each host 10, each peripheral device 30, each console 50 or each combination thereof. Optimally, a single central triggering circuitry may be used in mediator 1000. For example, for mediator that secure EDID data through DDC channel, as described in FIG. 4 and the accompanying description, each supported display may have a dedicated push button effectively duplicating triggering circuitry for each peripheral device, i.e., each display. Alternatively, for example, the system comprises two consoles each with two displays, and a single push button for each console. In this case, this triggering circuitries shared triggering circuitry between the displays in each console and assigned a dedicated circuitry for each console. Triggering circuitry 1100 may comprises a connection detector that monitor peripheral devices communication protocols 25 that are connected to mediator 1000. For example, any disconnection of a peripheral device may be used by triggering circuitry 1100. An event from a single peripheral devices communication protocols 25 may trigger an event that will affect other peripheral devices connected by different peripheral devices communication protocols 25. For example, in the case of locking mediator, a disconnect of one peripheral device may neutralized all the other peripheral devices connected to the same console. In another example, in a multiple peripheral devices console with a keyboard, a sequence of presses on the keyboard may trigger an event, e.g., triggering a lock command to lock the mediator. This trigger effects all other devices in the same console or even all the peripheral devices that are supported by the mediator. To indicate in FIG. 9 that some circuitries in triggering circuitry 1100 may be shared between hosts, peripheral devices, and/or consoles, while other may be dedicated to each host, each peripheral device and/or each console, the symbolic block of the circuitry is shadowed duplicated with a dashed line block. Similar symbolic illustration with the same meaning is applicable for circuitries 1200, 1300, 1400 and 1500.

Triggering circuitry 1100 is coupled to timing/control circuitry 1200. Timing/control circuitry 1200 controls circuitries 1300, 1400 and 1500. Timing/control circuitry 1200 may have shared circuitry for controlling the mediator or may have any combination of dedicated circuitries to hosts, peripheral devices and/or consoles. For example, in the case of multiple EDID copying with multiple displays, i.e., with multiple I2C EEPROMs, the reading and writing from the memories may be performed simultaneously with a shared timing/control circuitry 1200 and dedicated controller to each memory or with shared controller and dedicated timing/control circuitry 1200 that sequentially control the reading and writing from each of the memories.

Setup circuitry 1300 may be shared between or dedicate to hosts, peripheral devices and/or consoles as well. Setup circuitry 1300 may comprises dedicated circuitry that is specific to the type of the peripheral device, the type of communication channel 25 and the type of security measurement applied during security setup stage. For example, in some mediators EDID EEPROM might be shared between hosts for every display. In other mediators, for better security, each host has a dedicated EDID EPROM for each display that it might be coupled to. Typically for any peripheral devices communication protocols 25 that is connected to mediator 1000, there is a dedicated circuitry in setup circuitry 1300. However, in some cases, a shared setup circuitry is used and switching circuitry 1400 switch one of several possible peripheral devices communication protocols 25 to be coupled to setup circuitry 1300.

Switching circuitry 1400 may be shared between or dedicate to hosts, peripheral devices and/or consoles as well. Switching circuitry 1400 provides the core connection between all peripheral devices communication protocols 25 connected to hosts 10 via the host side ports, peripheral devices 30 connected by peripheral devices communication protocols 25 via the console side ports, setup circuitry 1300, and the rest of mediator circuitry 1500. The interfacing part of switching circuitry 1400 typically cannot be shared since each host side port and console side port must be connected to switching circuitry 1400. However, in the switching hierarchy inside switching circuitry 1400, some level of switching may be shared. Conditioned upon control from the timing/control circuitry 1200, switching circuitry 1400, switches between the coupling of: (1) at least one of the host side ports with at least two of any one of (a) the setup circuitry 1300; (b) the rest of the mediator circuitries 1500; (c) one of the console side ports; (d) a null port, and (2) at least one of the console side ports with at least two of any one of (a) the setup circuitry 1300; (b) the rest of the mediator circuitries 1500; (c) one of the host side ports; (d) a null port.

Rest of mediator circuitry 1500 may be shared between or dedicate to hosts, peripheral devices and/or consoles as well. In an exemplary embodiment of the invention, this circuitry may comprise one or more programable controllers or processors, e.g., main mediator controller, that shared handling for several or all hosts, peripheral devices and/or consoles. Additionally or alternatively, splitting the workload between several controllers such as one for each console may be provided. Additionally or alternatively, a dedicated controller may be used for each host, peripheral device and/or console. For example, mediator 1000 may have a dedicated device emulator (implemented by a controller) for each host and a dedicated host emulator (implemented by a controller as well) for each peripheral device.

In an exemplary embodiment of the invention, circuitries 1100, 1200, 1300, and 1400 may combine several enhanced security schemes together. For example, circuitries 1100, 1200, 1300, and 1400 may implement both EDID copy and display locking enhanced security schemes.

In an exemplary embodiment of the invention, mediator 1000 may be divided between two or more enclosures. In this case, circuitries 1100, 1200, 1300, 1400 and 1500 may be divided between the enclosures too. Communication between the parts of the circuitries is provided by intra mediator communication means.

Figure 10:
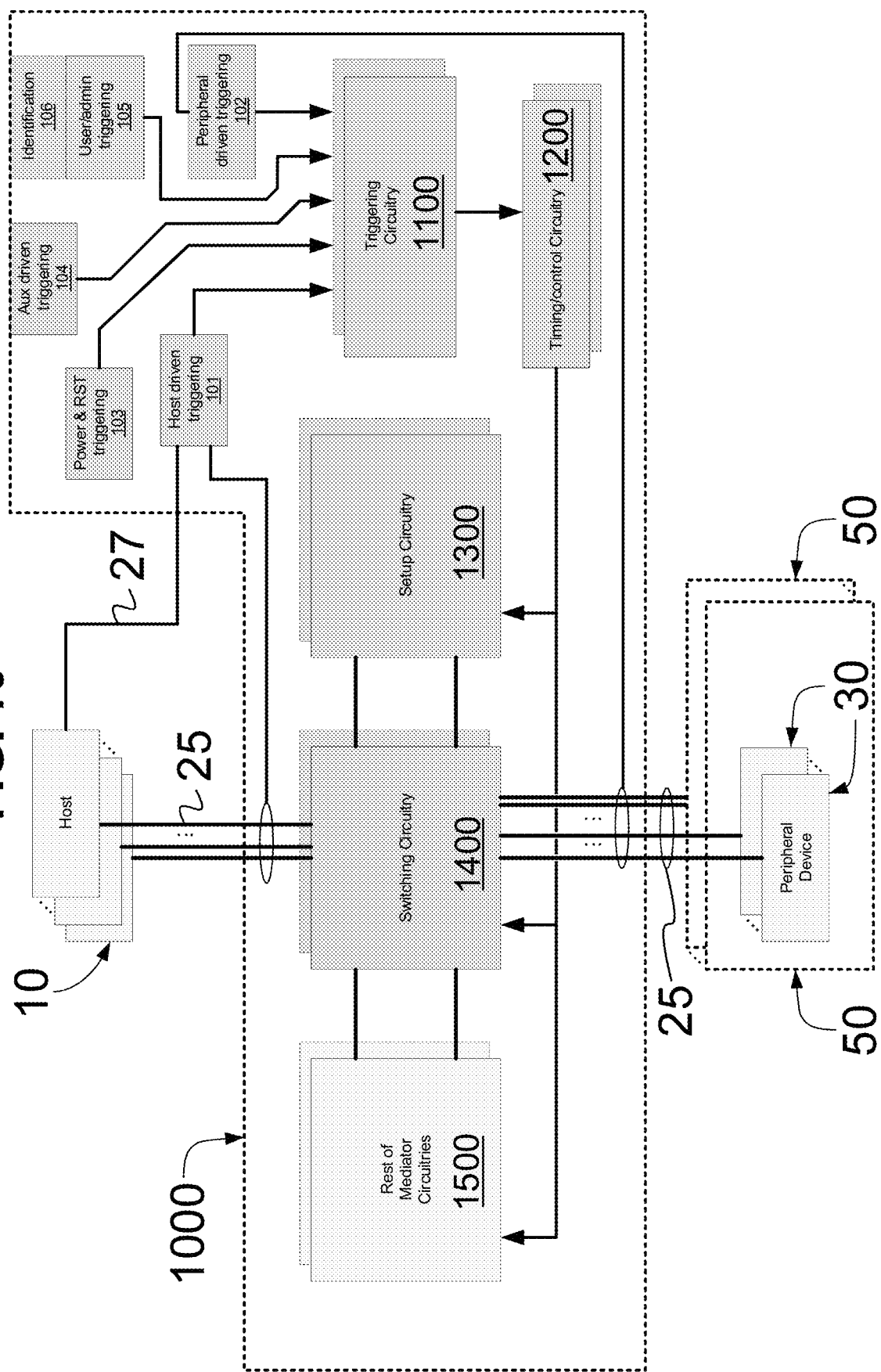
FIG. 10 is a block diagram of enhanced security mediator comprising a wide-ranging triggering functionality.

Reference is now made to FIG. 10. FIG. 10 illustrates a block diagram of enhanced security mediator 1000 comprising a wide-ranging triggering functionality. Mediator 1000 comprises all circuitries describe hereinabove with respect to FIG. 9. Triggering circuitry 1100 may comprise a connection detector circuitry 101 that enable triggering of the security setup stages by events initiated by any one of host 10 using peripheral devices communication protocols 25. Additionally or alternatively, a dedication communication link 27 between one or more hosts 10 and mediator 1000 may be used. Host driven circuitry 101 may be used to identify host connection and disconnection events that may be used to initiate security actions in mediator 1000. Triggering circuitry 1100 comprises circuitry 102 that drive triggers from events initiated by any one of peripheral devices 30 using peripheral devices communication protocols 25. Trigger may be initiated by connecting or disconnecting any one of peripheral devices 30, i.e., a connection detector, or by any operations performed during usage of peripheral devices 30. In an exemplary embodiment of the invention, a triggering event is initiated by having a dedicated key press sequence on a keyboard connected to mediator 1000. For example, a sequence of pressing left control key, F11, 'L', 'U' and '1' may trigger lock command event for locking mediator 1000 and a sequence of pressing left control key, F11, 'L', 'U' and '0' may trigger unlock command event for the locking mediator 1000. Additionally or alternatively, through the keyboard, the administrator (or the user) may enter a sequence of characters that are used as a password to activate a trigger. The triggering circuitry may contain a list of one-time passwords to lock or unlock locking mediator 1000. Each time a password is used to lock or unlock the mediator, the password is flagged as used and cannot be used again to lock or unlock the mediator. In some cases, the trigger event may combine several peripheral devices for example a card reader peripheral and a keyboard. In this case the triggering is enabled only when an identity card, or specific identity card, is inserted to the card reader and the identity details are written in to the mediator log. In another example, the triggering event may be enabled by the combination of keyboard input sequence and biometric device or a standard peripheral device such as camera or microphone where the user face picture or voice signature are checked and logged.

Triggering circuitry 1100 may comprises circuitry 103 that enable triggering of the security setup stages by events initiated by power-on or reset events.

Triggering circuitry 1100 may comprises circuitry 104 that enable triggering of the mediator by external auxiliary port. This port can be a serial or USB port that the administrator connecting a dedicated equipment, such as terminal, to trigger the mediator. This port can be used for general setup and log monitoring as well. Auxiliary port may be wired port or wireless port. For example, axillary port can be NFC port and triggering might be providing NFC card in proximity to mediator 1000. In an exemplary embodiment of the invention, auxiliary port of circuitry 104 is connected remotely to administration site and administrator may perform the triggering to mediator remotely. Optionally, auxiliary port is connected to the internet.

Triggering circuitry 1100 may comprise circuitry 105 that enable triggering by a user interface on mediator 1000 enclosure. The interface may be push button keys, knobs and the like. Circuitry 105 may be open to any user that has a physical access to mediator 1000 or be allowed only to administrators. To identify the administrator, identification circuitry 106 may be used. Identification may be performed by biometric means such as, fingerprint reader, iris reader or the like, or physical means such as, identification card reader, USB dongle or the like.

While in former embodiments of the locking mediator, the security setup stage, i.e., the device locking, was executed by non-programable enhanced security circuits, the locking mediator may be implemented using less secured programable circuits as well. Although less secured such a mediator is simpler, and less expansive, they still give an additional security level over similar, non-locking mediator.

Figure 11:
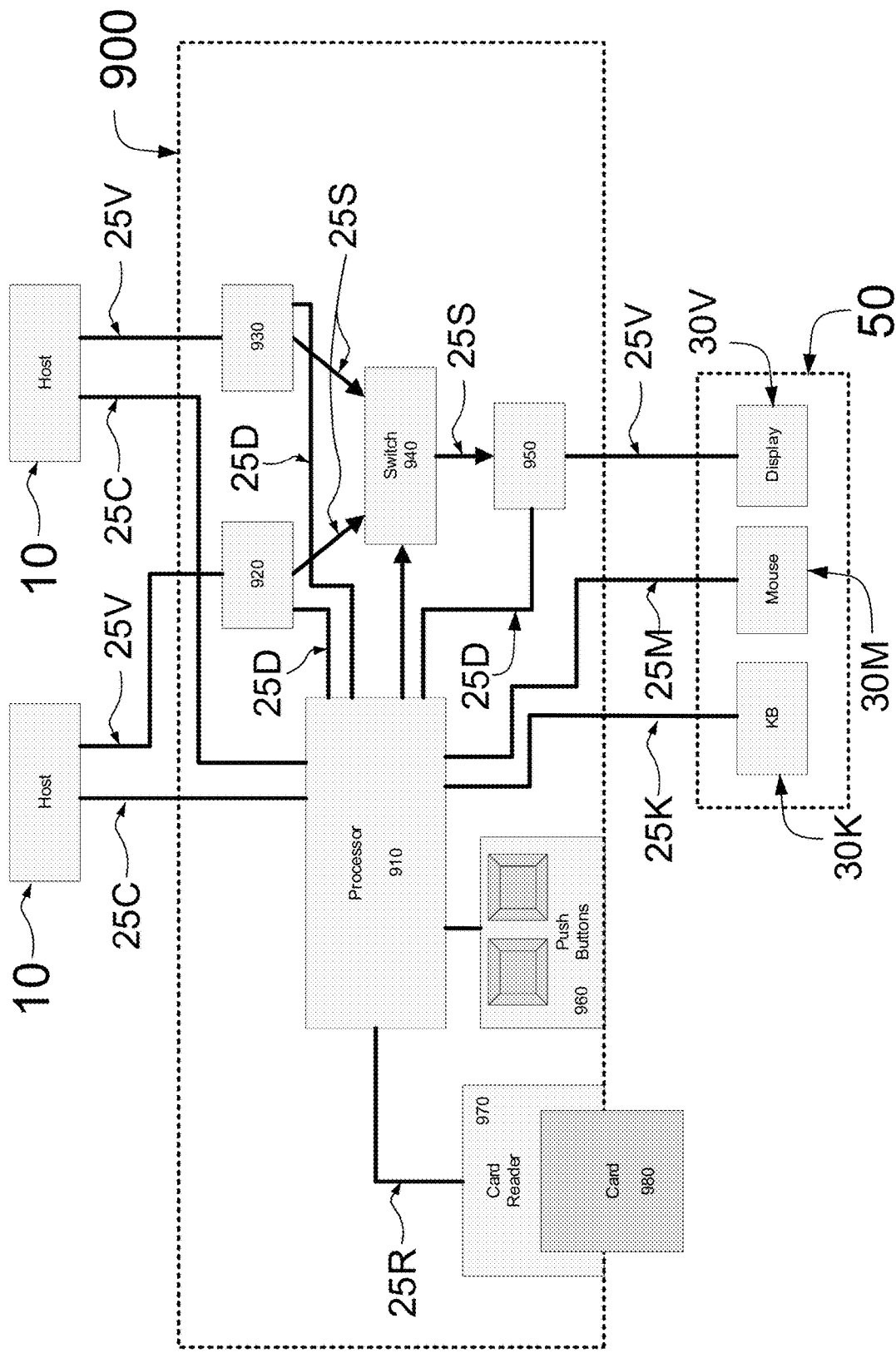
FIG. 11 is an illustration of an exemplary mediator implementing two hosts KVM switch with a device locking security scheme in accordance to another embodiment of the present invention.

Reference is now made to FIG. 11. FIG. 11 illustrates KVM switch that support switching between two hosts and comprises device locking security scheme. Locking mediator 900 is connected to two hosts 10 from one side and to KVM console 50, comprising a keyboard 30K, a mouse 30M and a display 30V from the other side. In normal operation stage (i.e., the devices are registered and locked), KVM switch 900 coupled the console 50 to one of the hosts 10. The switching is done based on two push buttons 960 located on the KVM switch 900 enclosure, e.g., KVM switch 900 front panel.

Keyboard 30K is connected to a processor 910 of KVM switch 900 using peripheral devices communication protocols 25K, for example, USB bus. USB bus protocol supports keyboard HID class device and it is the most common peripheral devices communication protocols 25 that used for keyboards in the present art. Mouse 30M is connected to a processor 910 of KVM switch 900 using peripheral devices communication protocols 25M, for example, USB bus protocol supports pointing device HID class device and it is the most common peripheral devices communication protocols 25 that used for mouse in the present art. Processor 910 communicate with the keyboard and the mouse using USB and can transfer the keyboard and mouse data to hosts 10. During security setup stage, processor 910 enumerate the keyboard and mouse to register and check the identity of the keyboard and mouse. During normal operation, processor 910 transfers keyboard and mouse data to one of the hosts conditioned upon the selection of the host by the user using the two push buttons 960. Processor 910 is connected to host using peripheral devices communication protocols 25C. Peripheral devices communication protocols 25C (the "C" stands for Composite) multiplex on a single communication protocol both the keyboard and the mouse, for example, peripheral devices communication protocols 25C maybe USB bus with composite device (KB+Mouse). Peripheral devices communication protocols 25C may multiplex other peripheral devices such as smart card reader 970. Optionally, peripheral devices communication protocols 25C may transport the data of display 30V. Display 30V is connected to mux 950 using peripheral devices communication protocols 25V. Mux 950 separates between the video stream 25S that is transmitted to display 30V from one of hosts 10 and DDC channel 25D that is used by processor 910 to identify display 30V. Video stream 25S to the display is coming from switch 940. Switch 940 is controlled by processor 910 that selects the active host 10 that will transmit its video to display 30V. The peripheral devices communication protocols 25S that connect between each host 10 and locking mediator 900 are connected to circuits 920 and 930 that separate between the streams 25S that transfers directly to switch 940 and DDC channels 25D that are connected to processor 910. In exemplary embodiment, DDC channels 25D may be I2C bus transferring EDID data. In an exemplary embodiment of the invention, peripheral device communication protocol 25V may be DVI, HDMI or DisplayPort (DP). Processor 910 may just act as a switch for DDC channels 25D and transfer the data between the active host and display 30V. Alternatively, for more secure operation, processor 910 may read and store in mediator 900 the EDID data from display in security setup stage, and provides this data to the active host, if requested by the host, in the normal operation stage.

In the following paragraphs the KVM switch 900 operation as a locking mediator is described. In an exemplary embodiment of the invention, KVM switch 900 is provided with an admin card 980 used to identify the administrator and perform the locking scheme. On first operation, administrator connect the peripheral devices and power-up the KVM switch 900. The security setup stage is performed by processor 910 with a flow chart that is similar to the one that was illustrated in FIG. 7 and FIG. 8 and the accompanying description with proper adaptations. After removing admin card 980, the KVM switch is locked and no other peripheral may be used with securing mediator 900. Admin card 980 is kept by the administrator. The user of KVM switch 900 cannot change the peripheral device without having admin card 980. Admin card 980 identity info are kept in processor 910. User can use the smart card reader for authentication in front of hosts 10 with its own smart card but this card will not allow changing peripheral devices. In an exemplary embodiment of the invention, processor 910 is able to keep the user authenticated in both host 10 simultaneously. Alternatively, card reader 970 keeps authentication session only with the selected, i.e., active host. For changing and registering different peripheral devices, administrator may connect the new desired keyboard, mouse, and/or display, insert admin card 980 and power-up or reset KVM switch 900. Upon removal of admin card 980, the locking mediator 900 will be locked again. Processor 910 perform a programable version of the security functions of circuitries 110, 120, 130 and 140 or alternatively circuitries 1100, 1200, 1300 and 1400. Processor 910 performs the described hereinabove flowcharts of FIG. 7 or FIG. 8 that realize the locking mediator security scheme without the need for additional hardware but with the bonus of additional security provided by locking the peripheral devices. In other words, the last embodiment preventing the ability of connecting unauthorized peripheral devices without the need of adding new hardware to locking mediator 900.

In an exemplary embodiment of the invention, lock and unlock triggering is done by different circuitries, i.e., other than the card reader 970, as described hereinabove in different embodiments of the invention.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

Citation or identification of any reference in this application shall not be construed as an admission that such reference is available as prior art to the present invention.

What is claimed is:

1. A secure mediator for coupling between one or more hosts and one or more consoles comprising one or more peripheral devices, the secure mediator comprises:
   one or more host side ports, each host side port is configured to be connected to a corresponding host by a peripheral devices communication protocol;
   one or more console side ports, each console side port is configured to be connected to a corresponding one or more peripheral devices by a peripheral devices communication protocol;
   a triggering circuitry;
   a timing/control circuitry;
   a setup circuitry;
   a switching circuitry; and
   the rest of the secure mediator circuitries,
   wherein the triggering circuitry, timing/control circuitry, setup circuitry, and switching circuitry are non-programable circuitries,
   wherein the secure mediator has at least two stages: a security setup stage and a normal operation stage,
   wherein the triggering circuitry is configured to monitor events and to signal these events to the timing/control circuitry in order to trigger a transfer between the security setup stage and the normal operation stage,
   wherein the timing/control circuitry controls the execution of the security setup stage and transfers the secure mediator between the security setup stage and the normal operation stage,
   wherein the setup circuitry performs one or more security functions in the security setup stage to enhance the cyber security of the secure mediator, and
   wherein the switching circuitry, in response to control signals from the timing/control circuitry, switches between the coupling of:
   (1) at least one of the host side ports with at least two of any one of
      (a) the setup circuitry;
      (b) the rest of the secure mediator circuitries;
      (c) one of the console side ports;
      (d) a null port, and
   (2) at least one of the console side ports with at least two of any one of
      (a) the setup circuitry;
      (b) the rest of the secure mediator circuitries;
      (c) one of the host side ports;
      (d) a null port, and
   upon entering the security setup stage,
      the switching circuitry connects the setup circuitry with one or more setup ports selected from the one or more console side ports and the one or more host side ports,
      the setup circuitry obtains data from the one or more hosts and one or more peripheral devices connected to the setup ports using the peripheral devices communication protocols, and
   upon successful completion of security setup stage, the secure mediator enters the normal operation stage in which the switching circuitry connects between the one or more hosts and one or more peripheral devices either directly or through the rest of the secure mediator circuitries.

2. The secure mediator of claim 1, wherein the secure mediator is configured to support at least one of or any combination of (1) keyboard; (2) mouse; (3) pointing device; (4) display; (5) card reader; (6) microphone; (7) speaker; and (8) camera.

3. The secure mediator of claim 1, wherein the secure mediator is one of
   (1) a Keyboard Video Mouse (KVM) or a peripheral devices switch,
   (2) a Keyboard Video Mouse (KVM) or a peripheral devices matrix,
   (3) a peripheral devices communication protocol distance extender,
   (4) a peripheral devices communication protocol aggregator, and
   (5) a peripheral devices communication protocol converter.

4. The secure mediator of claim 1, wherein the security setup stage comprises copying a display EDID information to a non-volatile memory that reside in the secure mediator.

5. The secure mediator of claim 1, wherein the security setup stage comprises qualifying one or more peripheral devices prior to coupling to the one or more hosts.

6. The secure mediator of claim 1, wherein the setup circuitry comprises a USB enumerator.

7. The secure mediator of claim 1, wherein the security setup stage comprises peripheral devices registration.

8. The secure mediator of claim 1, wherein the triggering circuitry comprises a connection detector that detect a connection or a disconnection of peripheral device to the at least one of the console side ports.

9. The secure mediator of claim 1, wherein the triggering circuitry comprises a connection detector that detect a connection or a disconnection of host to the host side port.

10. The secure mediator of claim 1, wherein the triggering circuitry comprises an auxiliary port for triggering security events to the security mediator.

11. The secure mediator of claim 1, wherein the triggering circuitry comprises a user interface to enable user or administrator triggers security events to the security mediator.

12. The secure mediator of claim 1, wherein the triggering circuitry comprises identification means to enable authorized triggers security events by administrators only.

13. The secure mediator of claim 1, wherein the mediator stages further comprises neutralization stage, wherein in the neutralization stage coupling between at least one of the one or more hosts and at least one of the one or more peripheral devices is disabled.

14. The secure mediator of claim 1, wherein in normal operation stage a direct coupling between at least one of the one or more host side ports and at least one of the one or more console side ports is provided.

15. The secure mediator of claim 1, wherein in normal operation stage, an indirect coupling between at least one of the one or more host side ports and at least one of the one or more console side ports is provided, wherein the indirect coupling couples circuitries in the rest of the secure mediator circuitries that provide additional security functions between the one or more host side ports and the one or more console side ports.

16. The secure mediator of claim 15, wherein the additional security functions comprise at least one of or any combination of (1) host emulator; (2) device emulator; and (3) unidirectional enforcing data flow element.

17. The secure mediator of claim 1, wherein the secure mediator provides at least one of or any combination of (1) logging security events; (2) alerting security events; and (3) indicating security events.

18. The secure mediator of claim 1, wherein the triggering circuitry; the timing/control circuitry, the setup circuitry; and the switching circuitry comprises at least one of or any combination of (1) timer; (2) state machine; (3) Flip-flops; (4) non programable IC; (4) PLD; and (5) FPGA.

19. The secure mediator of claim 1, wherein the one or more of peripheral devices share a single peripheral devices communication protocol.

20. The secure mediator of claim 1, wherein the secure mediator is divided between two or more separated enclosures.

21. The secure mediator of claim 1, wherein the secure mediator is a locking secure mediator having an additional neutralization stage,
   wherein in the security setup stage the mediator registers the one or more peripheral devices,
   wherein in the normal operation stage the mediator couples between the one or more hosts and the one or more peripheral devices whenever the one or more peripheral devices had been registered previously by the security setup stage, and
   wherein in the neutralization stage, the mediator disables coupling between the hosts and the peripheral devices, whenever at least one peripheral device had not been registered previously by the security setup stage.

* * * * *